United States Patent [19]
Krener et al.

[11] Patent Number: 6,098,010
[45] Date of Patent: Aug. 1, 2000

[54] METHOD AND APPARATUS FOR PREDICTING AND STABILIZING COMPRESSOR STALL

[75] Inventors: Arthur J. Krener, Davis; Miroslav Krstic, San Diego, both of Calif.

[73] Assignee: The Regents of the University of California, Oakland, Calif.

[21] Appl. No.: 08/974,942

[22] Filed: Nov. 20, 1997

[51] Int. Cl.$^7$ .............................. G06F 19/00; G06G 7/70
[52] U.S. Cl. ..................... 701/100; 701/101; 340/966; 105/64.1
[58] Field of Search ................................ 701/100, 101, 701/102; 415/17, 27, 119, 207; 340/966; 184/6.11, 6.16; 105/61.5, 62.1, 64.1

[56] References Cited

U.S. PATENT DOCUMENTS

| | | | |
|---|---|---|---|
| 3,597,111 | 8/1971 | Salisbury et al. | 416/206 |
| 5,297,930 | 3/1994 | Moore | 415/182.1 |

*Primary Examiner*—William A. Cuchlinski, Jr.
*Assistant Examiner*—Gertrude Arthur
*Attorney, Agent, or Firm*—John P. O'Banion

[57] ABSTRACT

A method and apparatus for predicting the onset of stall in an axial flow compressor and stabilizing stall so as to achieve the maximum pressure rise to the combustor. Stall in an axial flow compressor is predicted by obtaining pressure or axial velocity measurements at a plurality of circumferential angles around a compressor stage, fourier transforming the measurements with respect to the circumferential angles to obtain a time history of the zeroth, first and higher modes, and determining amplitude gain at twice the rotor frequency of the transfer function from the product of the zeroth and first modes to the first mode, with an increase in amplitude gain depicting a right skewed compressor going into stall and a decrease in amplitude gain depicting a left skewed compressor going into stall. Rotating stall and surge in the compressor is stabilized so that the pressure rise to the combustor can be maximized by creating an oscillatory motion of the pressure and feeding said oscillatory motion back to vary the set point of an extremum seeking controller, wherein an internal rotating stall and surge feedback loop in said controller that stabilizes said compressor is closed and wherein an outer extremum seeking loop in said controller which maximizes the pressure rise is closed.

18 Claims, 15 Drawing Sheets

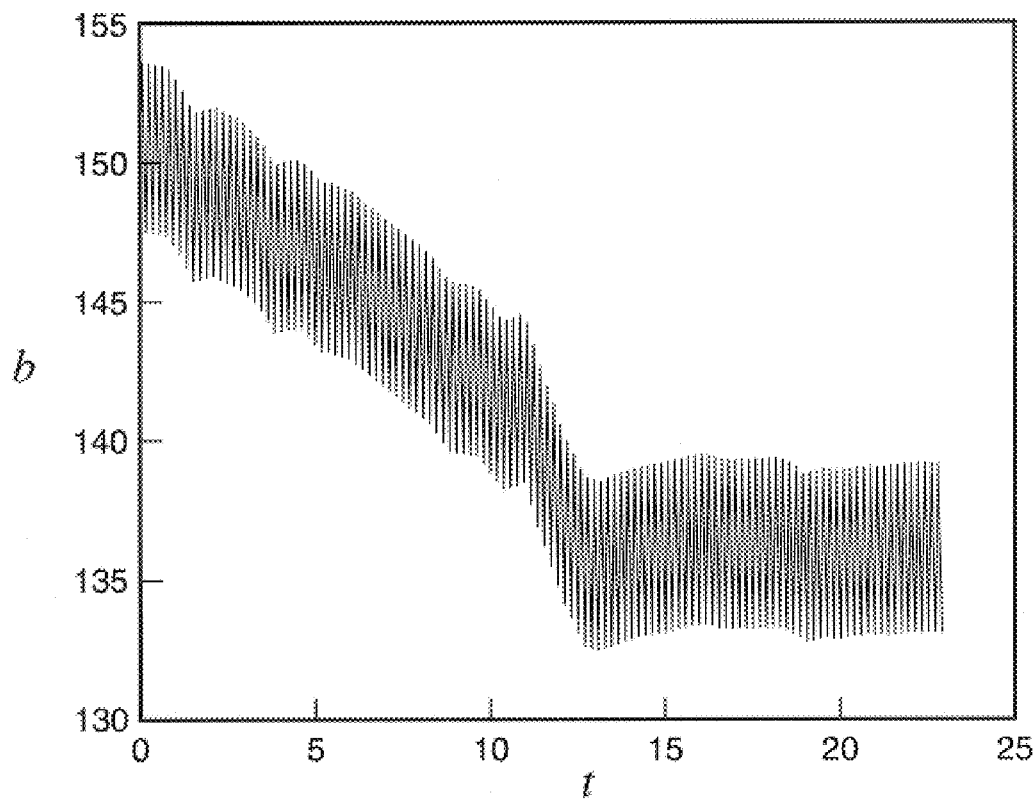
FIG. — 21
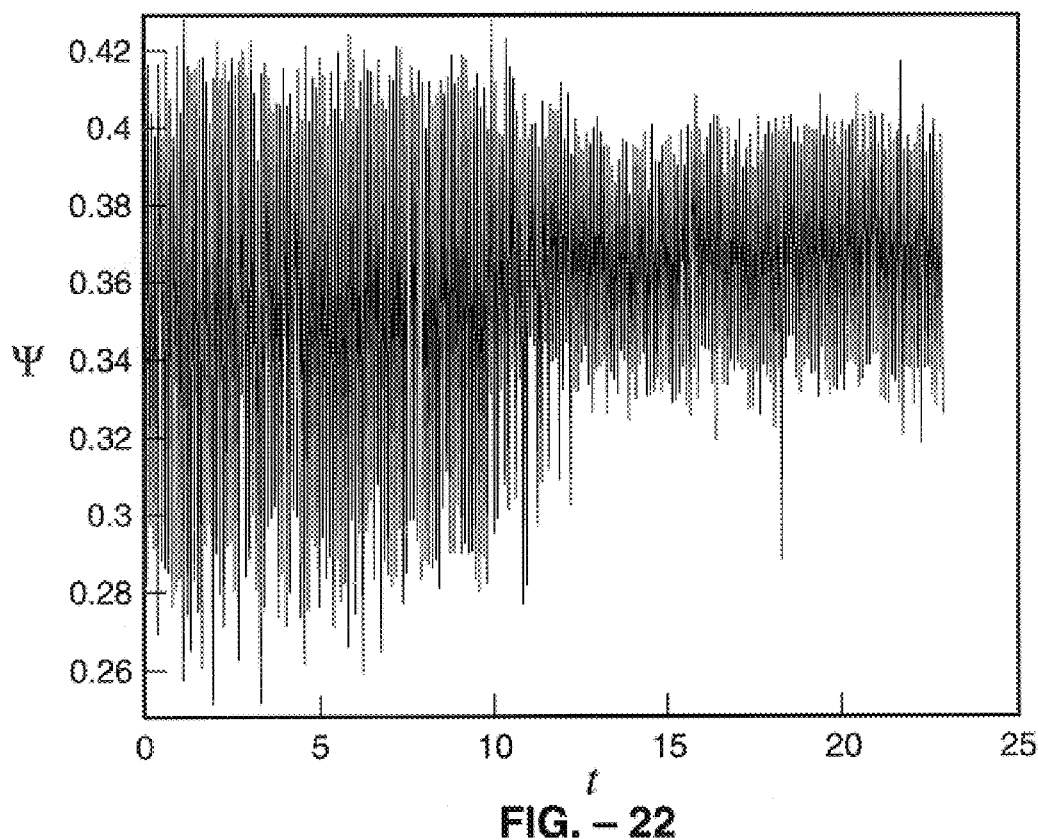
FIG. — 22

METHOD AND APPARATUS FOR PREDICTING AND STABILIZING COMPRESSOR STALL

CROSS-REFERENCE TO RELATED APPLICATIONS

Not Applicable

STATEMENT REGARDING FEDERALLY SPONSORED RESEARCH OR DEVELOPMENT

This invention was made with Government support under Contract Nos. 3-448724-22542 and F49620-95-1-0409, awarded by the Air Force Office of Scientific Research. The Government has certain rights in this invention.

REFERENCE TO A MICROFICHE APPENDIX

Not Applicable

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

REFERENCED PUBLICATIONS

The following publications, which are referenced herein by their reference number indicated in brackets, are incorporated herein by reference:

[1] K. J. Astrom and B. Wittenmark, *Adaptive Control*, 2nd Edition, Reading, Mass.: Addison-Wesley, 1995.

[2] A. Banaszuk and A. J. Krener, "Design of controllers for MG3 compressor models with general characteristics using graph backstepping," submitted, 1996.

[3] R. L. Behnken, R. D'Andrea, and R. M. Murray, "Control of rotating stall in a low-speed axial flow compressor using pulsed air injection: modeling, simulations, and experimental validation," *Proceedings of the 34th IEEE Conference on Decision and Control*, pp. 3056–3061, 1995

[4] P. F. Blackman, "Extremum-Seeking Regulators," in J. H. Westcott, ED., *An Exposition of Adaptive Control*, New York, N.Y.: The Macmillan Company, 1962

[5] S. Drakunov, U. Ozguner, P. Dix, and B. Ashrafi, "ABS control using optimum search via sliding modes," *IEEE Transactions on Control Systems Technology*, vol.3, pp. 79–85, 1995.

[6] C. S. Drapper and Y. T. Li, "Principles of optimalizing control systems and an application to the internal combustion engine," ASME, vol. 160, pp. 1–16, 1951, also in R. Oldenburger, Ed., *Optimal and Self-Optimizing Control*, Boston, Mass.: the M.I.T. Press, 1966

[7] K. M. Eveker, D. L. Gysling, C. N. Nett, and O. P. Sharma, "Integrated control of rotating stall and surge in aeroengines," 1995 *SPIE Conference on Sensing, Actuation, and Control in Aeropropulsion*, Orlando, April 1995.

[8] A. L. Frey, W. B. Deem, and R. J. Altpeter, "Stability and optimal gain in extremum- seeking adaptive control of a gas furnace," *Proceedings of the Third IFAC World Congress*, London, 48A, 1966.

[9] G. C. Goodwin and K. S. Sin, *Adaptive Filtering Prediction and Control*, Englewood Cliffs, N.J.: Prentice-Hall, 1984

[10] E. M. Greitzer, "Surge and rotating stall in axial flow compressors—Part I: Theoretical compression system model," *Journal of Engineering for Power*, pp. 190–198, 1976

[11] G. Gu, A. Sparks, and S. Banda, "Bifurcation based nonlinear feedback control for rotating stall in axial compressors," submitted, 1996.

[12] P. A. Ioannou and J. Sun, *Stable and Robust Adaptive Control*, Englewood Cliffs, N.J.: Prentice-Hall, 1995

[13] O. L. R. Jacobs and G. C. Shering, "Design of a single-input sinusoidal-perturbation extremum-control system," *Proceedings IEE*, vol. 115, pp. 212–217, 1968

[14] V. V. Kazakevich, "Extremum control of objects with inertia and of unstable objects," *Soviet Physics*, Dokl. 5, pp.658–661, 1960

[15] H. K. Khalil, *Nonlinear Systems*, 2nd edition, Englewood Cliffs, N.J.: Prentice-Hall, 1996

[16] M. Krstic, D. Fontaine, P. V. Kokotovic, and J. D. Paduano, "Useful nonlinearities and global bifurcation control of jet engine surge and stall," submitted to *IEEE Transactions on Automatic Control*, 1996.

[17] M. Krstic, I. Kanellakopoulos, and P. V. Kokotovic, *Nonlinear and Adaptive Control Design*, New York: Wiley, 1995

[18] M. Krstic and H. H. Wang, "Control of Deep-Hysteresis Aeroengine Compressors—Part II: Design of Control Laws," *Proceedings of the 1997 American Control Conference*, Albuquerque, N.M.

[19] M. Leblanc, "Sur l'electrification des chemins de fer au moyen de courants alternatifs de frequence elevee," *Revue Generale de l'Ectricite*, 1922

[20] D. C. Liaw and E. H. Abed, "Active control of compressor stall inception: a bifurcation- theoretic approach," *Automatica*, vol. 32, pp. 109–115, 1996, also in *Proceedings of the IFAC Nonlinear Control Systems Design Symposium*, Bordeaux, France, June 1992.

[21] F. E. McCaughan, "Bifurcation analysis of axial flow compressor stability," *SIAM Journal of Applied Mathematics*, vol. 20, pp. 1232–1253, 1990.

[22] S. M. Meerkov, "Asymptotic Methods for Investigating Quasistationary States in Continuous Systems of Automatic Optimization," *Automation and Remote Control*, no. 11, pp. 1726–1743, 1967.

[23] S. M. Meerkov, "Asymptotic Methods for Investigating a Class of Forced States in Extremal Systems," *Automation and Remote Control*, no. 12, pp. 1916–1920, 1967.

[24] S. M. Meerkov, "Asymptotic Methods for Investigating Stability of Continuous Systems of automatic Optimization Subjected to Disturbance Action," (in Russian) *Automatika I Telemekhanika*, no. 12, pp. 14–24, 1968.

[25] F. K. Moore and E. M. Greitzer, "A theory of post-stall transients in axial compression systems—Part 1: Development of equations," *Journal of Engineering for Gas Turbines and Power*, vol. 108, pp.68–76, 1986.

[26] I. S. Morosanov, "Method of extremum control," *Automatic & Remote Control*, vol. 18, pp. 1077–1092, 1957.

[27] I. I. Ostrovskii, "Extremum regulation," *Automatic & Remote Control*, vol. 18, pp. 900–907, 1957.

[28] J. D. Paduano, L. Valavani, A. H. Epstein, E. M. Greitzer, and G. R. Guenette, "Modeling for control of rotating stall," *Automatica*, vol. 30, pp. 1357–1373, 1966.

[29] A. A. Pervozvanskii, "Continuous extremum control system in the presence of random noise," *Automatic & Remote Control*, vol. 21, pp. 673–677, 1960.

[30] R. Sepulchre and P. V. Kokotivic, "Shape signifiers for control of surge and stall in jet engines," submitted to *IEEE Transactions on Automatic Control*, 1995.

[31] J. Sternby, "Extremum control systems: An area for adaptive control?" Preprints of the *Joint American Control Conference*, San Francisco, Calif., 1980, WA2-A.

[32] H. S. Tsien, *Engineering Cybernetics*, New York, N.Y.: McGraw-Hill, 1954.

[33] G. Vasu, "Experiments with optimizing controls applied to rapid control of engine pressures with high amplitude noise signals," *Transactions of the ASME*, pp. 481–488, 1957.

[34] H. H. Wang, M. Krstic, and M. Larsen, "Control of deep-hysteresis aeroengine compressors—Part I: a Moore-Geitzer type model," *Proceedings of the 1997 American Control Conference*, Albuquerque, N.M.

[35] B. Wittenmark and A. Urquhart, "Adaptive extremal control," *Proceedings of the 34th IEEE Conference on Decision and Control*, New Orleans, La., December 1995, pp. 1639–1644.

BACKGROUND OF THE INVENTION

1. Field of the Invention

The present invention pertains generally to controlling the operation of aeroengine compressors, and more particularly to a method and apparatus for predicting on the onset of stall and then using an extremum seeking controller to stabilize stall.

2. Description of the Background Art

The mainstream methods of adaptive control for linear [1,9,12] and nonlinear [17] systems are applicable only for regulation to known set points or reference trajectories. In some applications, the reference-to-output map has an extremum (w.l.o.g. we assume that it is a maximum) and the objective is to select the set point to keep the output at the extremum value. The uncertainty in the reference-to-output map makes it necessary to use some sort of adaptation to find the set point which maximizes the output. This problem, called "extremum control" or "self-optimizing control," was popular in the 1950's and 1960's [4,6,8,13,14,26,27,29], much before the theoretical breakthroughs in adaptive linear control of the 1980's. In fact, the emergence of extremum control dates as far back as the 1922 paper of Leblanc [19], whose scheme may very well have been the first "adaptive" controller reported in the literature. Among the surveys on extremum control, we find the one by Sternby [31] particularly useful, as well as Section 13.3 in Astrom and Wittenmark [1] which puts extremum control among the most promising future areas for adaptive control. Among the many applications of extremum control overviewed in [31] and [1] are combustion processes (for IC engines, steam generating plants, and gas furnaces), grinding processes, solar cell and radio telescope antenna adjustment to maximize the received signal, and blade adjustment in water turbines and wind mills to maximize the generated power. A more recent application of extremum control are anti-lock braking systems [5]. On the theoretical forefront, the studies of Meerkov [22,23,24] stand out.

The idea to use extremum control for maximizing the pressure rise in an aeroengine compressor is not new. As far back as in 1957, George Vasu of the NACA (now NASA) Lewis Laboratory published his experiments in which he varied the fuel flow to achieve maximum pressure [33]. While his engine was apparently not of the kind that could enter either rotating stall or surge instabilities (so local stabilizing feedback was not necessary), he recognized the opportunity to maximize the pressure by extremum seeking feedback long before the compressor models of the 1970's and 1980's emerged and the dynamics of compression systems were understood.

However, most of the results available on extremum control consider a plant as a static map. A few references approach problems where the plant is a cascade of a nonlinear static map and a linear dynamic system (the so-called Hammerstein and Wiener models), see [35] and references therein.

In a jet engine, the role of a compressor is to provide pressure rise to the combustor. The pressure rise is a function of throttle opening. This function is not monotonic, it has a maximum, i.e., there is a physical limit to the level of pressure that can be achieved at the compressor exit. The objective is to operate the compressor at its maximum pressure so that a smaller compressor can be employed to achieve a desired thrust.

There are two problems associated with the objective of achieving maximum pressure.

First, even if we know the location of the maximum, i.e., the throttle opening which gives the maximal pressure rise, this pressure cannot be achieved with a constant throttle opening because of compressor instabilities, rotating stall and surge, that occur for values of the throttle opening near the maximizing value. In this regard, it is known that active control can be used to stabilize rotating stall and surge. Active control consists of measuring the pressure in the compressor (in various places) and varying the throttle opening as a function of these instabilities in an intelligent way which stabilizes the rotating stall and surge instabilities.

Second, even when rotating stall and surge instabilities are removed using throttle opening that varies as a function of pressure measurements, the mean pressure rise may be below the physically achievable maximum value because of various perturbations and changes/uncertainties in the operating regime. Thus, the main problem that remains is (in very simplified terms) how to determine the mean value of the throttle opening—"the DC component"—to maximize the pressure rise (in addition to the "AC component" which we referred to as the rotating stall and surge control in the previous paragraph).

If a compressor were a static and stable system whose input/output representation is a function that has a maximum, one would employ standard "extremum seeking" (also known as "optimum seeking, extremum searching, hill climbing, optimalizing, etc.") feedback schemes which would guarantee that the system would operate near the maximum of the output variable. The difference between the compressor and these standard problems is that compressor is not a static but a dynamic system, and that it is not (open-loop) stable but unstable in the high-pressure regime.

BRIEF SUMMARY OF THE INVENTION

The present invention pertains to a method and apparatus for predicting the onset of stall in an axial flow compressor and, using an extremum seeking control method and apparatus in accordance with the invention, stabilizing stall so as to achieve the maximum pressure rise to the combustor. Recognizing that a compressor is a dynamic system, the present invention stabilizes surge and stall generally as follows:

1. The control input (throttle), the measured output (pressure) and a particular SET POINT parameter are used in an extremum seeking scheme for the compressor.

2. The extremum seeking is applied to the unstable compressor system, by first closing an internal (rotating stall and surge) feedback loop that stabilizes it, and then closing an outer extremum seeking loop which maximizes the pressure.

3. In order for the extremum seeking scheme to be applicable to a system that is dynamic, rather than static, design guidelines have been devised for choosing parameters of the filters in the scheme and for choosing the frequency and the amplitude of the perturbation signal. In qualitative terms, the frequency and the amplitude of the perturbation signal should be small compared to (an order of magnitude smaller than) the eigenvalues of the compressor system with "rotating stall and surge control" (the gains of rotating stall and surge control should, in turn, be chosen sufficiently high to prevent the perturbation from being on the same time scale with the compressor dynamics). The filter parameters in the extremum seeking scheme should be small compared to the frequency and amplitude of the perturbation signal.

In the present invention we approach the general problem where the nonlinearity with an extremum is a reference-to-output equilibrium map for a general nonlinear (non-affine in control) system stabilizable around each of these equilibria by a local feedback controller. In fact, in the application which we present, the equilibrium map can even have multiple (bifurcated) branches. Our invention is much more general that the existing extremum control results which represent the plant as a static nonlinear map possibly cascaded with a linear dynamic block-we allow the plant to be a general nonlinear dynamic system (possibly non-affine in control and open-loop unstable) whose reference-to-output equilibrium map has a maximum, and whose equilibria are locally exponentially stabilized. Then we apply the extremum seeking scheme to a nonlinear model of an aeroengine compressor for which several control laws have appeared recently for stabilization of rotating stall and surge instabilities. The reference-to- pressure rise equilibrium map has a distinct maximum (which is the desired operating point) but the location of this maximum is uncertain. We demonstrate that the extremum seeking feedback can be used effectively for maximizing the pressure rise. The actuation requirements (both the bandwidth and the magnitude limits) are much less demanding than those for stabilization of rotating stall and surge.

In accordance with an aspect of the invention, stall in an axial flow compressor is predicted by obtaining pressure or axial velocity measurements at a plurality of circumferential angles around a compressor stage, fourier transforming the measurements with respect to the circumferential angles to obtain a time history of the zeroth, first and higher modes, and determining amplitude gain at twice the rotor frequency of the transfer function from the product of the zeroth and first modes to the first mode, with an increase in amplitude gain depicting a right skewed compressor going into stall and a decrease in amplitude gain depicting a left skewed compressor going into stall.

In accordance with another aspect of the invention, stall in an axial flow compressor is predicted by obtaining pressure or axial velocity measurements at eight angles circumferentially around a compressor stage, fourier transforming said measurements into the 0, 1, 2, 3 circumferential modes with respect to the angles at which the measurements were obtained, computing time histories of the amplitudes of the modes, time windowing the histories of the amplitudes of the modes and computing, for each window, the cross spectrum at twice the rotor frequency between the product of the amplitudes of the zeroth and first modes with the amplitude of the first mode, with an increase in cross spectrum depicting a right skewed compressor going into stall and a decrease in cross spectrum depicting a left skewed compressor going into stall.

In accordance with another aspect of the invention, rotating stall and surge in the compressor is stabilized so that the pressure rise to the combustor can be maximized by creating an oscillatory motion of the pressure rise and feeding said oscillatory motion back to vary the set point of an extremum seeking controller.

In accordance with another aspect of the invention, rotating stall and surge in the compressor is stabilized so that the pressure rise to the combustor can be maximized, comprising the steps of creating an oscillatory motion of the pressure and feeding said oscillatory motion back to vary the set point of an extremum seeking controller, wherein an internal rotating stall and surge feedback loop in said controller that stabilizes said compressor is closed and wherein an outer extremum seeking loop in said controller which maximizes the pressure rise is closed.

In accordance with another aspect of the invention, rotating stall and surge instabilities in the compressor of an aeroturbine engine are stabilized by creating an oscillatory motion of the pressure and feeding it back to tune the set point of a controller.

An object of the invention is to identify precursors of stall in an axial flow compressor.

Another object of the invention is to predict stall in an axial flow compressor.

Another object of the invention is to stabilize stall and surge in a compressor.

Another object of the invention is to maximum the pressure rise to the combustor in an aeroturbine engine.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 21 is a graph showing the time response of the bleed angle initiating from the stall characteristic of the compressor of the test rig shown in FIG. 16.

FIG. 22 is a graph showing the time response of the pressure rise initiating from the stall characteristic of the compressor of the test rig shown in FIG. 16.

DETAILED DESCRIPTION OF THE INVENTION

1. Predicting Stall.

Consider the Moore Greitzer 3 dimensional model for an axial flow compressor with a smooth compressor characteristic $\Psi_c(\Phi)$ around stable operating point $\Psi=\Psi_e$, $\Phi=\Phi_e$, A=0. In displacement coordinates $\Psi_d=\Psi-\Psi_e$, $\Phi_d=\Phi-\Phi_e$, A, the dynamics is $$\dot{\Psi}_d = a_{-1}\left[\Phi_d + \Phi_e - (K_T+u)\sqrt{\Psi_e+\Psi_d}\right] \quad (1.1)$$

$$\dot{\Phi} = a_0\left[D^1\Psi_c\Phi_d - \Psi_d + D^2\Psi_c\left[\frac{\Phi_d^2}{2}+\frac{A^2}{4}\right] + D^3\Psi_c\left[\frac{\Phi_d^3}{6}+\frac{A^2\Phi_d}{4}\right]\right]+\ldots \quad (1.2)$$

$$\dot{A} = a_1\left[D^1\Psi_c A + D^2\Psi_c A\Phi_d + D^3\Psi_c\left[\frac{A\Phi_d^2}{2}+\frac{A^3}{8}\right]\right]+\ldots \quad (1.3)$$

where

Ψ=annulus averaged pressure rise
Φ=annulus averaged mass flow
A=amplitude of first mode stall
B=Greitzer stability parameter
$K_T$=throttle parameter
$l_c$=length of inlet duct in wheel radians
m=Moore outlet duct parameter
μ=inertia of gas in blade passage $$\alpha_{-1} = \frac{1}{4B^2 l_c} \quad (1.4)$$

$$\alpha_0 = \frac{1}{l_c} \quad (1.5)$$

$$\alpha_1 = \frac{1}{m+\mu} \quad (1.6)$$

and $D^j\Psi_c$ is the $j^{th}$ derivative of the compressor characteristic $\Psi_c$, evaluated at the operating point. The transfer function from $A\Phi_d$ to A is $$T(s) = \frac{\alpha_1 D^2\Psi_c}{s-\alpha_1 D^1\Psi_c} \quad (1.7)$$

If $D^2\Psi_c<0$ then the amplitude at $s=2\omega_e i$ is $$|T(2\omega_e i)| = \frac{-\alpha_1 D^2\Psi_c}{\sqrt{4\omega_e^2+\alpha_1^2 D^1\Psi_c^2}} \quad (1.8)$$

where $\omega_e$ is one rev. This changes with the set point $\Phi_e$. The derivative with respect to $\Phi_e$ is $$\frac{-\alpha_1 D^3\Psi_c(4\omega_e^2+\alpha_1^2 D^1\Psi_c^2)+\alpha_1^3 D^1\Psi_c D^2\Psi_c^2}{(4\omega_e^2+\alpha_1^2 D^1\Psi_c^2)^{\frac{3}{2}}} \quad (1.9)$$

At the stall point where $D^1\Psi=0$ this reduces to $$\frac{-\alpha_1 D^3\Psi_c}{2\omega_e} \quad (1.10)$$

Hence the change in the gain depends on the skewness of the compressor characteristic.

Right Skew $D^3\Psi_c>0$ $D^1|T(2\omega_e i|<0$ \quad (1.11)

Left Skew $D^3\Psi_c<0$ $D^1|T(2\omega_e i|>0$ \quad (1.12)

As a right compressor goes into stall, the amplitude gain from the product of $A_{\omega_e}$ and $\Phi_{\omega_e}$ to $A_{2\omega_e}$ increasing. As a left skew compressor goes into stall, the amplitude gain is decreasing. (This assumes $\Psi_c$ is smooth thru stall.)

The phase of the Transfer Function at $s=2\omega_e i$ is $$\arctan\left(\frac{2\omega_e}{\alpha_1 D^1\Psi_c}\right) \quad (1.13)$$

which is in (π/2, π) since $D^1\Psi_c<0$.

The derivative with respect to $\Phi_e$ is $$\frac{-2\omega_e \alpha_1 D^2\Psi_c}{4\omega_e^2+\alpha_1^2 D^1\Psi_c^2} \quad (1.14)$$

This is positive under the reasonable assumption that $D^2\Psi_c<0$. Hence as the compressor stalls, the phase decreases to π/2.

EXAMPLE 1

Figure 1:
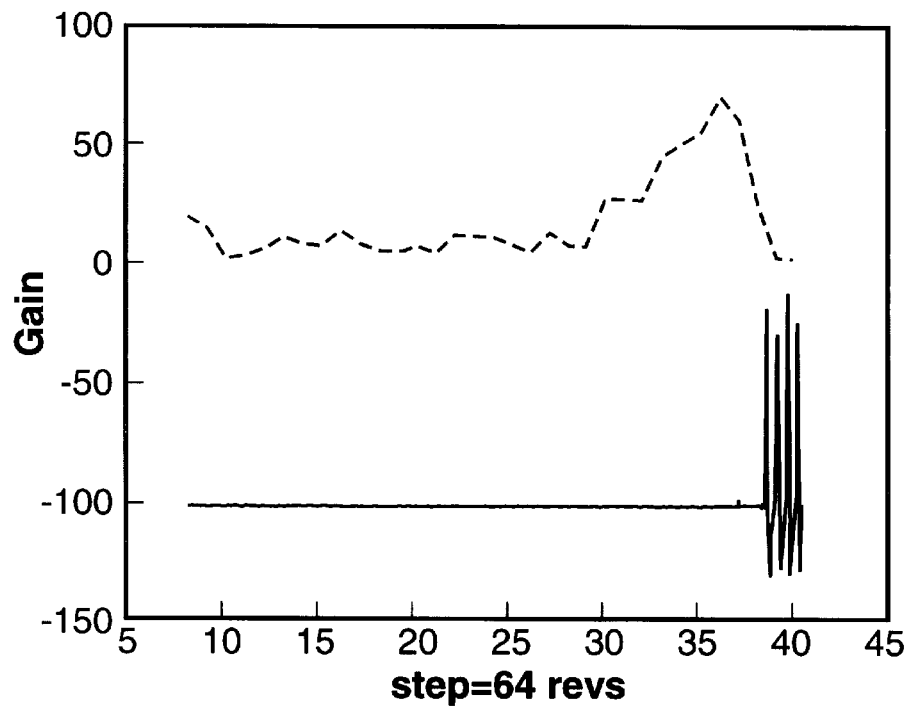
FIG. 1 is a graph showing amplitude gain determined in accordance with the present invention as a compressor stalls along with a raw sensor signal, with amplitude gain shown as a dashed line and the raw sensor signal as a solid line.
Figure 2:
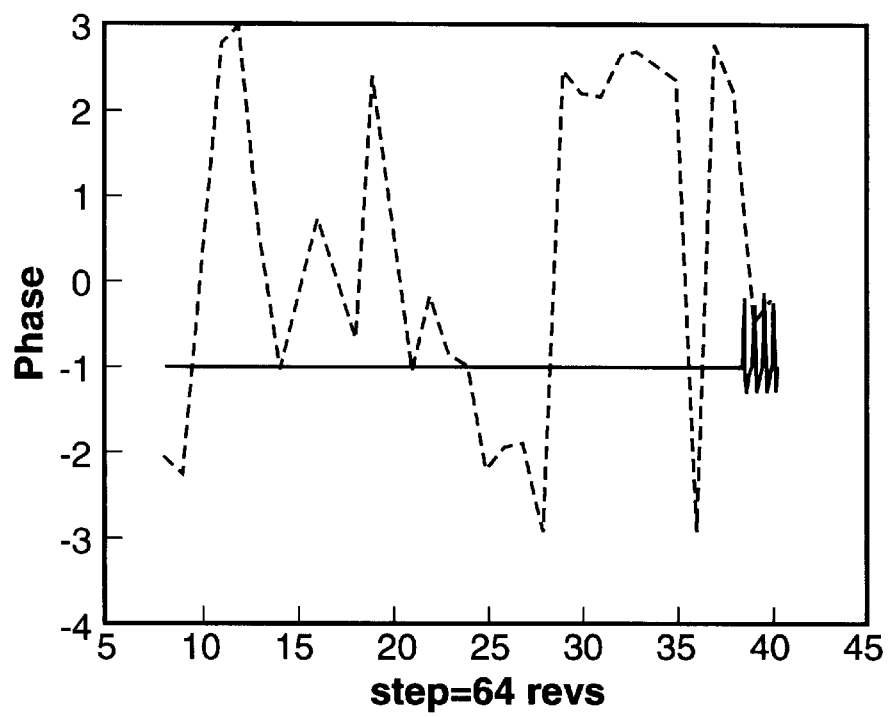
FIG. 2 is a graph showing phase as the compressor depicted in FIG. 1 stalls along with a raw sensor signal, with phase shown as a dashed line and the raw sensor signal shown as a solid line.

We now describe the behavior of these quantities on Wright Patterson 4 Stage Data supplied by Hoying. The compressor was taken on a rig consisting of 4 stages of a core compressor. The stages are labeled 2–5. There were eight sensors, which can be resolve into the 0–3 circumferential Fourier modes, labeled $\Phi$, $A_1$, $\theta_1$, $A_2$, $\theta_2$, $A_3$, $\theta_3$. The low speed runs (<85%) were very noisy and therefore ignored. The high speed runs were taken with a samprate=1000 and an analog cutoffreq=400. For the 100% speed run, twice the rotor frequency $2\omega_e$=rrevs/60 is higher than the Nyquist rate of 500 hz so only the efc6207_st5_90% run was processed. The MATLAB code is attached as Appendix A. FIG. 1 shows the amplitude gain as the compressor stalls along with a raw sensor signal. FIG. 1 shows the phase of the compressor stalls along with a raw sensor signal.

The rise in amplitude indicates the impending stall 400 rotor revs early. The fall off in amplitude immediately prior to stall is because of the increasing noise in the regime. The phase is less conclusive. A better signal can be found by measuring the phase at a frequency higher than $2\omega_e$.

2. Stabilizing Stall.

2.1 Introduction.

In the present invention we approach the general problem where the nonlinearity with an extremum is a reference-to-output equilibrium map for a general nonlinear (non-affine in control) system stabilizable around each of these equilibria by a local feedback controller. In fact, in the application which we present, the equilibrium map can even have multiple (bifurcated) branches.

Our invention is that it provides the first rigorous proof of stability for an extremum seeking feedback scheme. We employ the tools of averaging and singular perturbations to show that solutions of the closed-loop system converge to a small neighborhood of the extremum of the equilibrium map. The size of the neighborhood is inversely proportional to the adaptation gain and the amplitude and the frequency of a periodic signal used to achieve extremum seeking. Our invention highlights a fundamentally nonlinear mechanism of stabilization in an extremum seeking loop.

2.2 Extremum Seeking—Problem Statement.

Consider a general SISO nonlinear model $$\dot{x} = f(x, u) \tag{2.1}$$

$$y = h(x), \tag{2.2}$$

Where $x \in \mathbb{R}^n$ is the state, $u \in \mathbb{R}$ is the input, $y \in \mathbb{R}$ is the output, and $f: \mathbb{R}^n \times \mathbb{R} \to \mathbb{R}^n$ and $h: \mathbb{R}^n \to \mathbb{R}$ are smooth. Suppose that we know a smooth control law $$u = a(x, \theta) \tag{2.3}$$

parameterized by a scalar parameter $\theta$. The closed-loop system $$\dot{x} = f(x, a(x, \theta)) \tag{2.4}$$

then has equilibria parameterized by $\theta$. We make the following assumptions about the closed-loop system.

Assumption 2.2.1 There exists a smooth function $l: \mathbb{R} \to \mathbb{R}^n$ such that $$f(x, a(x, \theta)) = 0 \text{ if and only if } x = l(\theta). \tag{2.5}$$

Assumption 2.2.2 For each $\theta \in \mathbb{R}$, the equilibrium $x = l(\theta)$ of the system (4) is locally exponentially stable.

Hence, we assume that we have a control law (3) which is robust with respect to its own parameter $\theta$ in the sense that it exponentially stabilizes any of the equilibria that $\theta$ may produce. Except for the requirement that Assumption 2.2.2 hold for any $\theta \in \mathbb{R}$ (which we impose only for notational convenience and can easily relax to an interval in $\mathbb{R}$), this assumption is not restrictive. It simply means that we have a control law designed for local stabilization and this control law need not be based on modeling knowledge of either $f(x, u)$ or $l(\theta)$.

The next assumption is central to the problem of peak seeking.

Assumption 2.2.3 There exists $\theta^* \in \mathbb{R}$ such that $$(h \circ l)'(\theta^*) = 0 \tag{2.6}$$

$$(h \circ l)''(\theta^*) < 0. \tag{2.7}$$

Thus, we assume that the output equilibrium map $y = h(l(\theta))$ has a maximum at $\theta = \theta^*$. Our objective is to develop a feedback mechanism which maximizes the steady state value of y but without requiring the knowledge of either $\theta^*$ or the functions h and i. Our assumption that $h \circ l$ has a maximum is without loss of generality; the case with a minimum would be treated identically by replacing y by -y in the subsequent feedback design.

2.3 Peak Seeking Method.

Figure 3:
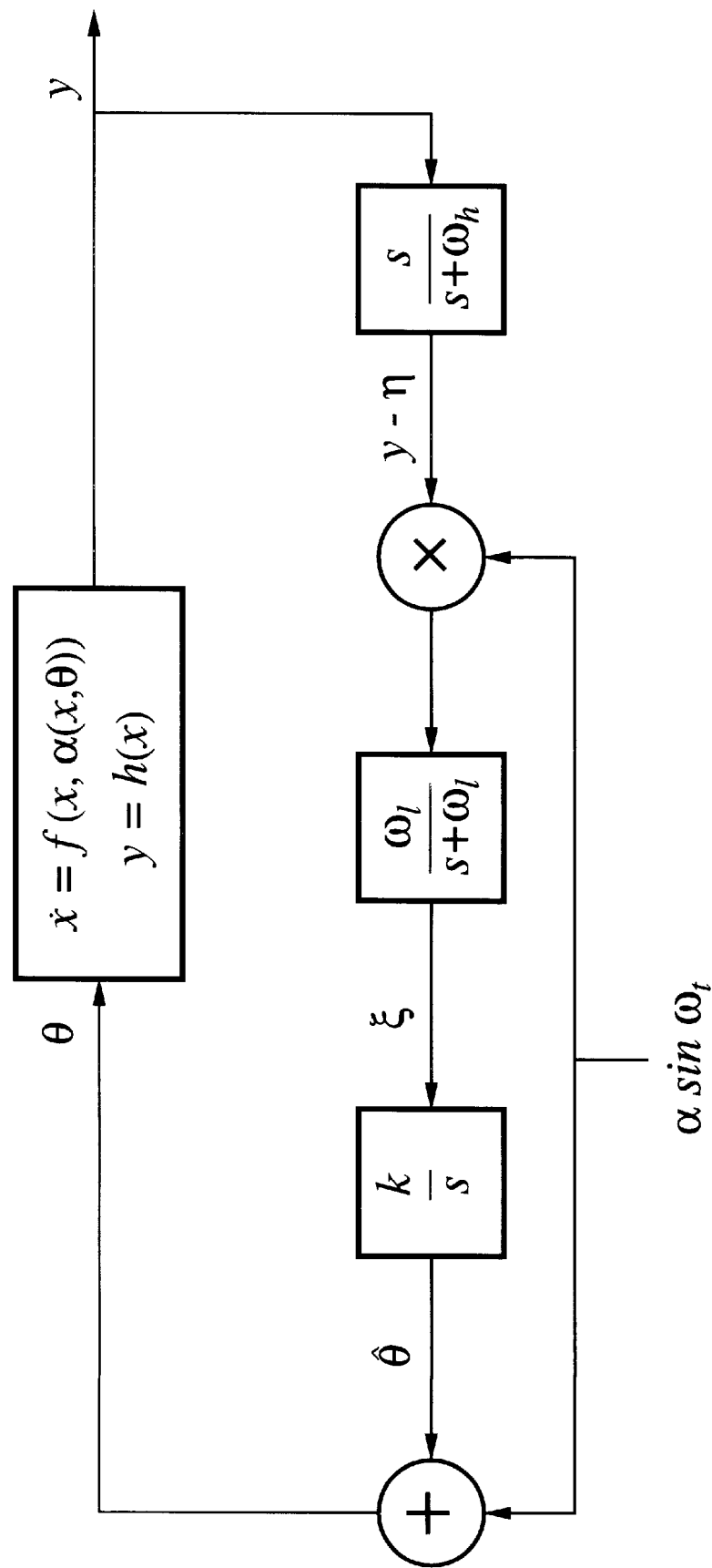
FIG. 3 is a functional block diagram of a peak seeking feedback scheme in accordance with the present invention.

The feedback method of the present invention is shown in FIG. 3. It is an extension of a simple method of seeking extrema of static nonlinear maps [4]. Before we engage in extensive efforts to prove stability of the scheme, we explain its basic idea. We start by pointing out that it is impossible to conclude that a certain point is a maximum without visiting the neighborhood on both sides of the maximum. For this reason, we employ a slow periodic perturbation a sin $\omega$t which is added to a signal $\hat{\theta}$, our best estimate of $\theta^*$ (the persistent nature of a sin $\omega$t may be undesirable but is necessary to maintain a maximum in the face of changes in functions f and h). If the perturbation is slow, then the plant appears as a static map $y = h \circ l(\theta)$ (see FIG. 4) and its dynamics do not interfere with the peak seeking scheme. If $\hat{\theta}$ is on either side of $\theta^*$, the perturbation a sin $\omega$t will create a periodic response of y which is either in phase or out of phase with a sin $\omega$t. The high-pass filter $$\frac{s}{s + \omega_h}$$

eliminates the "DC component" of y. Thus, a sin $\omega$t and $$\frac{s}{s + \omega_h} y$$

will be (approximately) two sinusoids which are in phase for $\hat{\theta} < \theta^*$ and out of phase for $\hat{\theta} > \theta^*$.

In either case, the product of $$\frac{\omega_l}{s+\omega_l}$$

the two sinusoids will have a "DC component" which is extracted by the low-pass filter $$\frac{\omega_l}{s+\omega_l}.$$

The sign of the DC component $\xi$ provides the direction to the integrator $\hat{\theta}=k/s \; \xi$ for moving $\hat{\theta}$ towards $\theta^*$.

Figure 4:
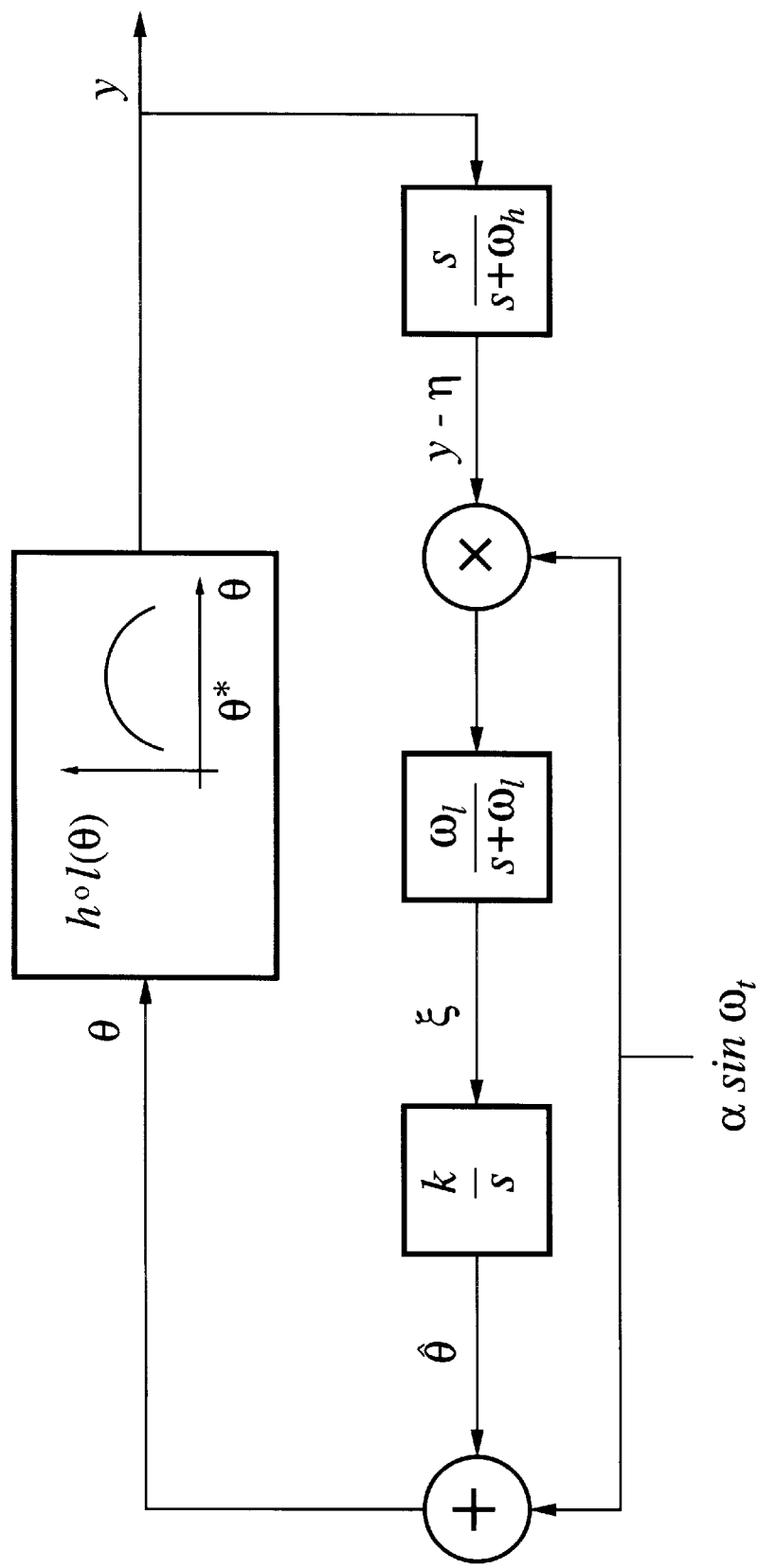
FIG. 4 is a functional block diagram of the peak seeking feedback scheme of FIG. 3 shown as a static map due to perturbation a sin $\omega t$ being slow.
Figure 5:
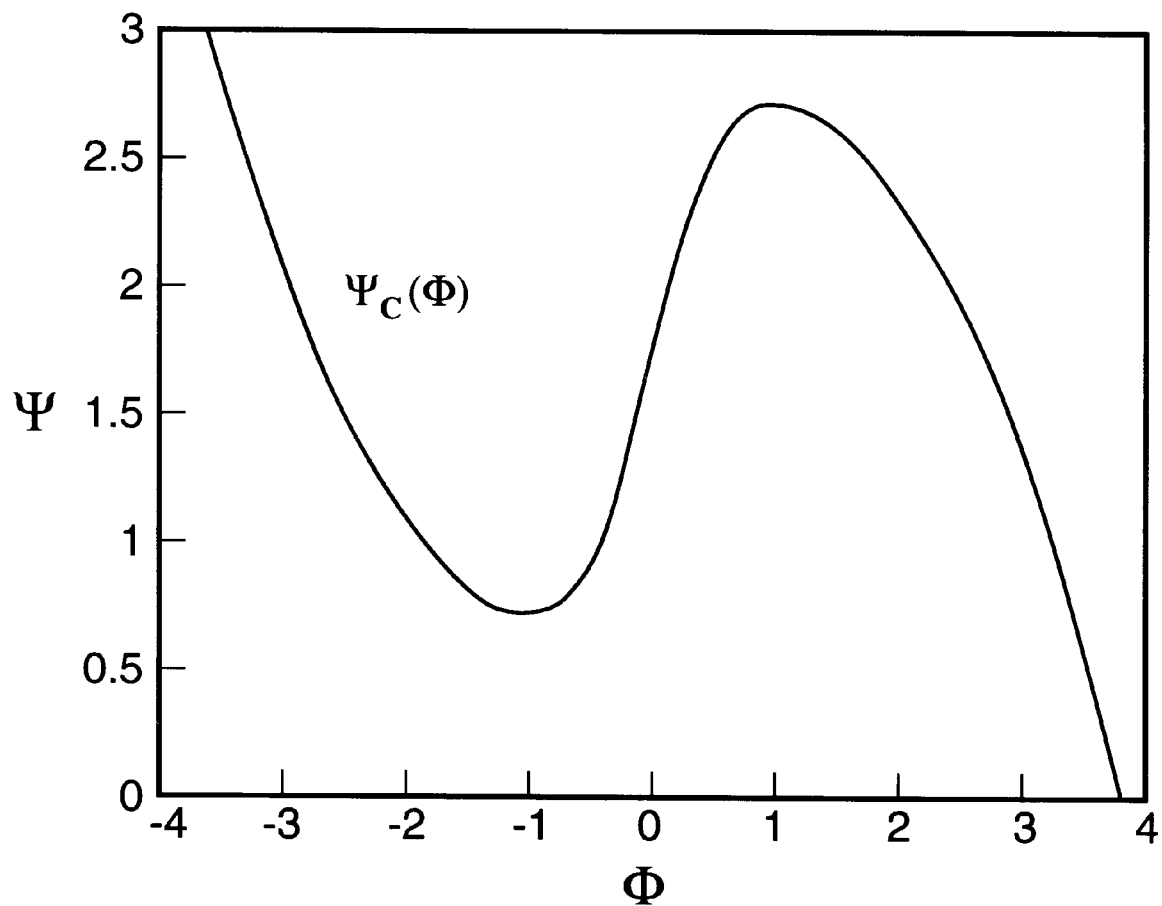
FIG. 5 is a graph showing the "compressor characteristic" $\Psi_c(\Psi)$ for a compressor.

Despite its apparent simplicity, the proof of "stability" of this feedback scheme has not appeared in the literature even for the static case in FIG. 4. As we shall see in the sequel, both the analysis of the scheme and the selection of design parameters are indeed intricate. These parameters are selected as $$\omega_h = \omega\omega_H = \omega\delta\omega'_H = O(\omega\delta) \tag{2.8}$$

$$\omega_l = \omega\omega_L = \omega\delta\omega'_L = O(\omega\delta) \tag{2.9}$$

$$k = \omega K = \omega\delta K' = O(\omega\delta), \tag{2.10}$$

where $\omega$ and $\delta$ are small positive constants and $\omega'_H$, $\omega'_L$, and $k'$ are $(O)(1)$ positive constants. As it will become apparent later, a also needs to be small.

From (2.8) and (2.9) we see that the cut-off frequencies of the filters need to be lower than the frequency of the perturbation signal. In addition, the adaptation gain k needs to be small. Thus, the overall feedback system has three time scales:

fastest—the plant with the stabilizing controller,
medium—the periodic perturbation, and
slow—the filters in the peak seeking scheme.

The analysis that follows treats first the static case from FIG. 4 using the method of averaging (Section 2.4). Then we use the singular perturbation method (Section 2.5) for the full system in FIG. 3.

Before we start our analysis, we summarize the system in FIG. 3 as $$\dot{x}=f(x,\,\alpha(x,\hat{\theta}+a\sin\omega t)) \tag{2.11}$$

$$\dot{\hat{\theta}}=k\xi \tag{2.12}$$

$$\dot{\xi}=-\omega_l\xi+\omega_l(y-\eta)a\sin\omega t \tag{2.13}$$

$$\dot{\eta}=-\omega_h\eta+\omega_h y \tag{2.14}$$

Let us introduce the new coordinates $$\tilde{\theta}=\hat{\theta}-\theta^* \tag{2.15}$$

$$\tilde{\eta}=\eta-h\circ l(\theta^*) \tag{2.16}$$

Then, in the time scale $\tau=\omega t$, the system (2.11) to (2.14) is rewritten as $$\omega\frac{dx}{d\tau}=f\!\left(x,\,\alpha\!\left(x,\,\overset{*}{\theta}+\tilde{\theta}+a\sin\tau\right)\right) \tag{2.17}$$

$$\frac{d}{d\tau}\begin{bmatrix}\tilde{\theta}\\ \xi\\ \tilde{\eta}\end{bmatrix}=\delta\begin{bmatrix}K'\xi\\ -\omega'_L\xi+\omega'_L\!\left(h(x)-h\circ l(\overset{*}{\theta})-\tilde{\eta}\right)a\sin\tau\\ -\omega'_H\tilde{\eta}+\omega'_H\!\left(h(\tilde{x})-h\circ l(\overset{*}{\theta})\right)\end{bmatrix} \tag{2.18}$$

2.4 Averaging Analysis.

The first step in our analysis is to study the system in FIG. 4. We "freeze" x in (2.17) at its "equilibrium" value $$x=l(\theta^*+\tilde{\theta}+a\sin\tau) \tag{2.19}$$

and substitute it into (2.18), getting the "reduced system"

$$\frac{d}{d\tau}\begin{bmatrix}\tilde{\theta}_r\\ \xi_r\\ \tilde{\eta}_r\end{bmatrix}=\delta\begin{bmatrix}K'\xi_r\\ -\omega'_L\xi_r+\omega'_L(v(\tilde{\theta}_r+a\sin\tau)-\tilde{\eta}_r)a\sin\tau\\ -\omega'_H\tilde{\eta}_r+\omega'_H v(\tilde{\theta}_r+a\sin\tau)\end{bmatrix}, \tag{2.20}$$

where $$v(\tilde{\theta}_r+a\sin\tau)=h\circ l(\theta^*+\tilde{\theta}_r+a\sin\tau)-h\circ l(\theta^*). \tag{2.21}$$

In view of Assumption 2.2.3, $$v(0)=0 \tag{2.22}$$

$$v'(0)=(h\circ l)'(\theta^*)=0 \tag{2.23}$$

$$v''(0)=(h\circ l)''(\theta^*)<0. \tag{2.24}$$

The system (2.20) is in the form to which the averaging method is applicable. The average model of (2.20) is $$\frac{d}{d\tau}\begin{bmatrix}\tilde{\theta}^a_\tau\\ \xi^a_\tau\\ \tilde{\eta}^a_\tau\end{bmatrix}=\delta\begin{bmatrix}K'\xi^a_\tau\\ -\omega'_L\xi^a_\tau+\frac{\omega'_L}{2\pi}a\int_0^{2\pi}v(\tilde{\theta}^a_\tau+a\sin\sigma)\sin\sigma d\sigma\\ -\omega'_H\tilde{\eta}^a_\tau+\frac{\omega'_H}{2\pi}\int_0^{2\pi}v(\tilde{\theta}^a_\tau+a\sin\sigma)\sigma d\sigma\end{bmatrix}. \tag{2.25}$$

First we need to determine the average equilibrium ($\tilde{\theta}_\tau^{a,e}$, $\xi_\tau^{a,e}$, $\tilde{\eta}_\tau^{a,e}$) which satisfies $$\xi_\tau^{a,e}=0 \tag{2.26}$$

$$\int_0^{2\pi}v(\tilde{\theta}_\tau^{a,e}+a\sin\sigma)\sin\sigma d\sigma=0 \tag{2.27}$$

$$\tilde{\eta}_\tau^{a,e}=\frac{1}{2\pi}\int_0^{2\pi}v(\tilde{\theta}_\tau^{a,e}+a\sin\sigma)d\sigma. \tag{2.28}$$

By postulating $\tilde{\theta}_\tau^{a,e}$ in the form $$\tilde{\theta}_\tau^{a,e}=b_1 a+b_2 a^2+O(a^3), \tag{2.29}$$

substituting in (2.27), using (2.22) and (2.23), integrating, and equating the like powers of a, we get $v''(0)b_1=0$ and $v''(0)b_2+\tfrac{1}{8}v'''(0)=0$, which implies that $$v''(0)b_1=0. \tag{2.30}$$

Another round of lengthy calculations applied to (2.28) yields $$\tilde{\eta}_{\tau}^{a,e} = \frac{v''(0)}{4}a^2 + O(a^3). \tag{2.31}$$

Thus, the equilibrium of the average model (2.25) is $$\begin{bmatrix} \tilde{\theta}_{\tau}^{a,e} \\ \tilde{\xi}_{\tau}^{a,e} \\ \tilde{\eta}_{\tau}^{a,e} \end{bmatrix} = \begin{bmatrix} -\frac{v'''(0)}{8v''(0)}a^2 + O(a^3) \\ 0 \\ \frac{v''(0)}{4}a^2 + O(a^3) \end{bmatrix}. \tag{2.32}$$

The jacobian of (2.25) at $(\tilde{\theta}, \tilde{\xi}, \tilde{\eta})_{\tau}^{a,e}$ is $$J_{\tau}^a = \delta \begin{bmatrix} 0 & K' & 0 \\ \frac{\omega_L'}{2\pi} a \int_0^{2\pi} v'(\tilde{\theta}_{\tau}^{a,e} + a\sin\sigma)\sin\sigma d\sigma & \omega_L' & 0 \\ \frac{\omega_H'}{2\pi} \int_0^{2\pi} v'(\tilde{\theta}_{\tau}^{a,e} + a\sin\sigma)d\sigma & 0 & -\omega_H' \end{bmatrix}. \tag{2.33}$$

Since $J_{\tau}^a$ is block-lower-triangular we easily see that it will be Hurwitz if and only if $$\int_0^{2\pi} v'(\tilde{\theta}_{\tau}^{a,e} + a\sin\sigma)\sin\sigma d\sigma < 0. \tag{2.34}$$

More calculations that use (2.22) and (2.23) give $$\int_0^{2\pi} v'(\tilde{\theta}_{\tau}^{a,e} + a\sin\sigma)\sin\sigma d\sigma = \pi v''(0)a + O(a^2). \tag{2.35}$$

By substituting (2.35) into (2.33) we get $$det(\lambda I - J_{\tau}^a) = \left(\lambda^2 + \delta\omega_L'\lambda - \frac{\delta^2 \omega_L' K'}{2}v''(0)a^2 + O(\delta^2 a^3)\right)(\lambda + \delta\omega_H'), \tag{2.36}$$

which, in view of (2.24), proves that $J_{\tau}^a$ is Hurwitz for sufficiently small a. This, in turn, implies that the equilibrium (2.32) of the average system (2.25) is exponentially stable for a sufficiently small a. Then, according to the Averaging Theorem [15, Theorem 8.3] we have the following results.

Theorem 2.4.1 Consider the system (2.20) under Assumption 2.2.3. There exists $\bar{\delta}$ and $\bar{a}$ such that for all $\delta \in (0, \bar{\delta})$ and $a \in (0, \bar{a})$ the system (2.20) has a unique exponentially stable periodic solution $(\tilde{\theta}_{\tau}^{2\pi}(\tau), \tilde{\xi}_{\tau}^{2\pi}(\tau), \tilde{\eta}_{\tau}^{2\pi}(\tau))$ of period $2\pi$ and this solution satisfies $$\left\| \begin{bmatrix} \tilde{\theta}_{\tau}^{2\pi}(\tau) + \frac{v'''(0)}{8v''(0)}a^2 \\ \tilde{\xi}_{\tau}^{2\pi}(\tau) \\ \tilde{\eta}_{\tau}^{2\pi}(\tau) - \frac{v''(0)}{4}a^2 \end{bmatrix} \right\| \le O(\delta) + O(a^3), \forall \tau \ge 0. \tag{2.37}$$

This result implies that all solutions $(\tilde{\theta}_{\tau}(\tau), \tilde{\xi}_{\tau}(\tau), \tilde{\eta}_{\tau}(\tau))$, and, in particular, their $\tilde{\theta}_{\tau}(\tau)$–components, converge to an $O(\delta + a^2)$–neighborhood of the origin. It is important to interpret this result in terms of the system in FIG. 4. Since $y = h \circ l$ $(\theta^* + \tilde{\theta}_{\tau}(\tau) + a \sin \tau)$ and $(h \circ l)'(\theta^*) = 0$, we have $$y - h \circ l(\theta^*) = (h \circ l)''(\theta^*)(\tilde{\theta}_{\tau} + a\sin\tau)^2 + O((\tilde{\theta}_{\tau} + a \sin \tau)^3), \tag{2.38}$$

where $$\tilde{\theta}_{\tau} + a\sin\tau = \tag{2.39}$$

$$(\tilde{\theta}_{\tau} - \tilde{\theta}_{\tau}^{2\pi}) + \left(\tilde{\theta}_{\tau}^{2\pi} + \frac{(h \circ l)'''(\theta^*)}{8(h \circ l)''(\theta^*)}a^2\right) - \frac{(h \circ l)'''(\theta^*)}{8(h \circ l)''(\theta^*)}a^2 + a\sin\tau$$

since the first term converges to zero, the second term is $O(\delta + a^3)$, the third term is $O(a^2)$ and the fourth tern is $O(a)$, then $$\limsup_{\tau \to \infty} |\tilde{\theta}_{\tau}(\tau) + a \sin \tau| = O(a + \delta). \tag{2.40}$$

Thus, (2.38) yields $$\limsup_{\tau \to \infty} |y(\tau) - h \circ l(\theta^*)| = O(a^2 + \delta^2). \tag{2.41}$$

The last expression characterizes the asymptotic performance of the peak seeking scheme in FIG. 4 and explains why it is not important that the periodic perturbation be small but also that the cut-off frequencies of the filters and the adaptation gain k be low.

Another important conclusion can be drawn from (2.37). The solution $\tilde{\theta}_{\tau}(\tau)$ will converge $$O(\delta + a^3) - \text{close to} - \frac{(h \circ l)'''(\theta^*)}{8(h \circ l)''(\theta^*)}a^2.$$

Since $(h \circ l)''(\theta^*) < 0$, the sign of this quantity depends on the sign of $(h \circ l)'''(\theta^*)$. If $(h \circ l)'''(\theta^*) > 0$ (respectively, <0), then the curve $h \circ l(\theta)$ will be more "flat" on the right (respectively, left) side of $\theta = \theta^*$. Since $\tilde{\theta}_{\tau}$ will have an offset in the direction of sign $\{(h \circ l)''(\theta^*)\}$, then $\tilde{\theta}_{\tau}(\tau)$ will converge to the "flatter" side of $h \circ l(\theta)$. This is precisely what we want—to be on the side where $h \circ l(\theta)$ is less sensitive to variations in $\theta$ and closer to its maximum value.

2.5 Singular Perturbation Analysis.

Now we address the full system in FIG. 3 whose state space model is given by (2.17) and (2.18) in the time scale $\tau = \omega t$. To make the notation in our further analysis compact, we write (2.18) as $$\frac{dz}{d\tau} = \delta G(\tau, x, z), \tag{2.42}$$

where $z = (\tilde{\theta}, \tilde{\xi}, \tilde{\eta})$. By Theorem 2.4.1, there exists an exponentially stable periodic solution $z_{\tau}^{2\pi}(\tau)$ such that $$\frac{dz_{\tau}^{2\pi}(\tau)}{d\tau} = \delta G(\tau, L(\tau, z_{\tau}^{2\pi}(\tau)), z_{\tau}^{2\pi}(\tau)), \tag{2.43}$$

where $L(\tau, z) = l(\theta^* + \tilde{\theta} + a \sin \tau)$. To bring the system (2.17) and (2.42) into the standard singular perturbation form, we shift the state z using the transformation $$\tilde{z} = z - z_{\tau}^{2\pi}(\tau) \tag{2.44}$$

and get $$\frac{d\tilde{z}}{d\tau} = \delta \tilde{G}(\tau, x, \tilde{z}) \tag{2.45}$$

-continued $$w\frac{dx}{d\tau} = \tilde{F}(\tau, x, \tilde{z}), \quad (2.46)$$

where $$\tilde{G}(\tau,x,\tilde{z})=G(\tau,x,\tilde{z}+z_\tau^{2\pi}(\tau))-G(\tau,L(\tau,z_\tau^{2\pi}(\tau)), z_\tau^{2\pi}(\tau)) \quad (2.47)$$

$$\tilde{F}(\tau, x, \tilde{z}) = f\left(x, a\left(x, \theta^* + \underbrace{\tilde{\theta} - \tilde{\theta}_\tau^{2\pi}(\tau) + \tilde{\theta}_\tau^{2\pi}(\tau)}_{\tilde{z}_1} + a\sin\tau\right)\right). \quad (2.48)$$

We note that $$x=L(\tau,\tilde{z}+z_\tau^{2\pi}(\tau)) \quad (2.49)$$

is the quasi-steady state, and that the reduced model $$\frac{d\tilde{z}_\tau}{d\tau} = \delta\tilde{G}(\tau, L(\tau, \tilde{z}_\tau + z_\tau^{2\pi}(\tau)), \tilde{z}_\tau + z_\tau^{2\pi}(\tau)) \quad (2.50)$$

has an equilibrium at the origin $\tilde{z}_\tau=0$ (cf. (2.47) with (2.49)). This equilibrium has been shown in Section 2.4 to be exponentially stable for sufficiently small a.

To complete the singular perturbation analysis, we also study the boundary layer model (in the time scale $t=\tau/\omega$):

$$\frac{dx_b}{dt} = \tilde{F}(\tau, x_b + L(\tau, \tilde{z} + z_\tau^{2\pi}(\tau)), \tilde{z}) \quad (2.51)$$
$$= f(x_b + l(\theta), a(x_b + l(\theta))),$$

where $\theta=\theta^*+\tilde{\theta}+a\sin\tau$ should be viewed as a parameter independent from the time variable t. Since $f(l(\theta),a(l(\theta),\theta))=0$, then $x_b=0$ is an equilibrium of (2.51). By Assumption 2.2.2, this equilibrium is exponentially stable.

By combining exponential stability of the reduced model (2.50) with the exponential stability of the boundary layer model (2.51), using Tikhonov's Theorem on the finite Interval [15, Theorem 9.4], we conclude the following:

(a) The solution $z(\tau)$ of (2.42) is $O(\omega)$-close to the solution $z_\tau(\tau)$ of (2.50), and therefore, it exponentially converges to an $O(\omega)$-neighborhood of the periodic solution $z_\tau^{2\pi}(\tau)$ which is $O(\delta)$-close to the equilibrium $z_\tau^{a,e}$. This, in turn, implies that the solution $\theta(\tau)$ of (2.18) exponentially converges to an $$O(\omega + \delta) - neighborhood\ of\ -\frac{(h \circ l)'''(\theta^*)}{8(h \circ l)''(\theta^*)}a^2 + O(a^3).$$

It follows then that $\theta(\tau)=\theta^*+\tilde{\theta}(\tau)+a\sin\tau$ exponentially converges to an $O(\omega+\delta+a)$-neighborhood of $\theta^*$.

(b) The solution $x(\tau)$ of (2.46) (which is the same as (2.17)) satisfies $$x(\tau)-l(\theta^*+\tilde{\theta}_\tau(\tau)+a\sin\tau)-x_b(t)=O(\omega), \quad (2.52)$$

where $\tilde{\theta}_\tau(\tau)$ is the solution of the reduced model (2.20) and $x_b(t)$ is the solution of the boundary layer model (2.51). From (2.52) we get $$x(\tau)-l(\theta^*)=O(\omega)+l(\theta^*+\tilde{\theta}_\tau(\tau)+a\sin\omega t)-l(\theta^*)-x_b(t). \quad (2.53)$$

Since $\tilde{\theta}_\tau(\tau)$ exponentially converges to the periodic solution $\tilde{\theta}_\tau^{2\pi}(\tau)$, which is $O(\delta)$-close to the average equilibrium $$\frac{(h \circ l)'''(\theta^*)}{8(h \circ l)''(\theta^*)}a^2 + O(a^3),$$

and since the solution $x_b(t)$ of (2.51) is exponentially decaying, then by (2.53), $x(\tau)-l(\theta^*)$ exponentially converges to an $O(\omega+\delta+a)$-neighborhood of zero. Consequently, $y=h(x)$ exponentially converges to an $O(\omega+\delta+a)$-neighborhood of its maximal equilibrium value $h\circ l$ $(\theta^*)$.

We summarize the above conclusions in the following theorem.

Theorem 2.5.1 Consider the feedback system (2.11) to (2.14) under Assumption 2.1–2.3. There exists a ball of initial conditions around the point $(x,\theta,\xi,\eta)=(l(\theta^*), \theta^*,0,h\circ l$ $(\theta^*))$ and constants $\bar{\omega}, \bar{\delta}$, and $\bar{a}$ such that for all $\omega\in(0, \bar{\omega}))$, $\delta\in(0, \bar{\delta})$, and $a\in(0, \bar{a})$, the solution $(x(t), \hat{\theta}(t), \xi(t), \eta(t))$ exponentially converges to an $O(\omega+\delta+a)$-neighborhood of that point. Furthermore, $y(t)$ converges to an $O(\omega+\delta+a)$-neighborhood of $h\circ l$ $(\theta^*)$.

A considerably more elaborate analysis would lead to the following stronger result which we give without proof Theorem 2.5.2 Under the conditions of Theorem 2.5.1, there exists a unique exponentially stable periodic solution of (2.11) to (2.14) in an $O(\omega+\delta+a)$-neighborhood of the point $(x, \hat{\theta}, \xi,\eta)=(l(\theta^*), \theta^*,0,h\circ l(\theta^*))$.

2.6 Application to a Compressor Model.

We now apply the peak seeking scheme of Section 2.3 to the Moore-Greitzer compressor model [25]:

$$\dot{R} = \frac{\sigma}{3\pi}\sqrt{R}\int_0^{2\pi}\Psi_c(\Phi + 2\sqrt{R}\sin\lambda)\sin\lambda d\lambda \quad (2.54)$$

$$\dot{\Phi} = -\Psi + \frac{1}{2\pi}\int_0^{2\pi}\Psi_c(\Phi + 2\sqrt{R}\sin\lambda)\sin\lambda d\lambda \quad (2.55)$$

$$\dot{\Psi} = \frac{1}{\beta^2}(\Phi - \Phi_T), \quad (2.56)$$

where the quantities are defined in Table 1, and the initial condition of the state $R=A^2/4$ is physically restricted to be nonnegative, $R(0)>0$. The throttle flow $\Phi_T$ is related to the pressure rise $\Psi$ through the throttle characteristic $$\Psi = \frac{1}{\gamma^2}(1 + \Phi_{C0} + \Phi_T)^2, \quad (2.57)$$

where $\gamma$ is the throttle opening. For smaller values of $\gamma$, a compressor undergoes two instabilities, rotating stall and surge. The possibility of a debilitating effect that these two instabilities pose limits the operating envelope of today's aeroengines. A comprehensive dynamical system study in [21] showed that the Moore-Greitzer model correctly (qualitatively) predicts both of the two instabilities. Starting with [20], several control designs have emerged which apply feedback by varying the throttle opening $\gamma$ to stabilize stall and surge (see [18,34] and the references therein).

2.6.1 Pressure peak seeking for the surge model.

For clarity of presentation, we first consider the model (2.54) to (2.56) restricted to the invariant manifold R=0:

$$\dot{\Phi} = -\Psi + \Psi_C(\Phi) \quad (2.58)$$

-continued $$\Psi = \frac{1}{\overline{\beta}^2}(\Phi + \Phi_T). \quad (2.59)$$

Figure 7A:
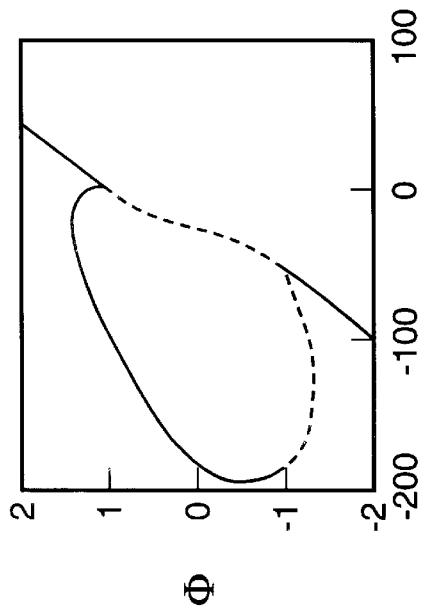
FIG. 7A through FIG. 7D are bifurcation diagrams for the case $\epsilon=0.9$, $\beta=1.42$, $c_R=30$, $c_\Psi=7$ and $c_\Phi=20$.
Figure 7B:
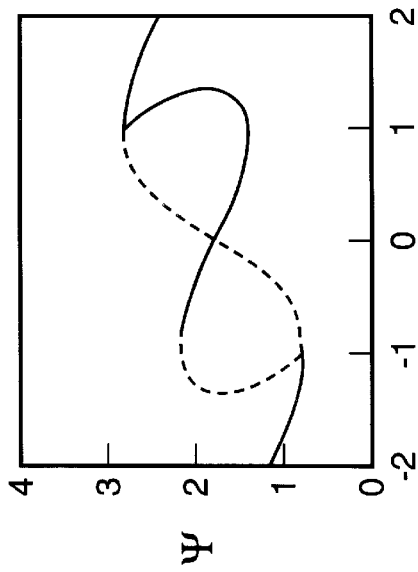
Figure 7C:
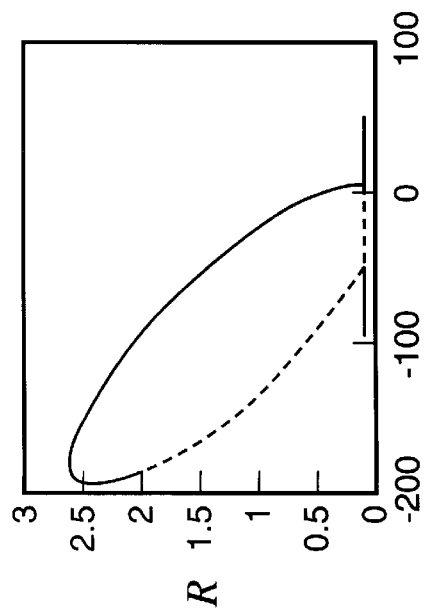
Figure 7D:
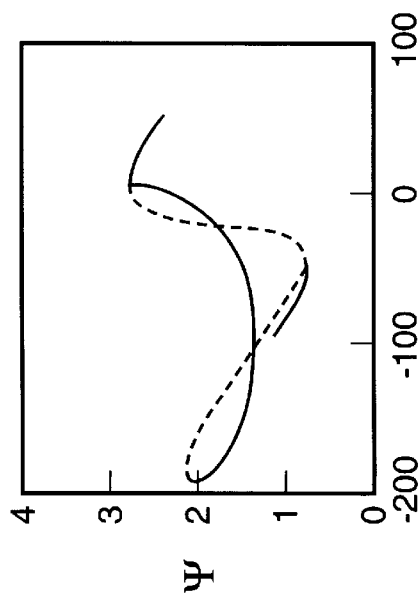

This model is, in fact, the surge model introduced by Greitzer [10], which describes limit cycle dynamics in centrifugal compressors. The function $\Psi_C(\Phi)$ represents the "compressor characteristics," whose typical S-shape is given in FIG. 7D. Our objective is to converge to the peak of this characteristic and operate the compressor with maximum pressure. Thus, we denote $x=(\Phi, \Psi)$ and $y=\Psi$. In [16] we showed that a control law of the form $$\gamma = \frac{\Gamma + \overline{\beta}^2(c_\Psi \Psi - c_\Phi \Phi)}{\sqrt{\Psi}} \quad (2.60)$$

stabilizes equilibria parameterized by $\Gamma$. If the design parameters are chosen to satisfy $$\overline{\beta}^2 > \beta, c_\Psi > 0, c_* = c_\Phi + \frac{1}{\overline{\beta}^2} > 0, \text{ and}$$

$$\frac{c_*}{c_\Psi} > \max_\Phi \frac{d\Psi_C(\Phi)}{d\Phi} \quad (2.61)$$

(which is finite), then the control law (2.60) achieves global exponential stability of equilibria parameterized by $\Gamma$.

In order to apply the peak seeking scheme, we first check that all three assumptions from Section 2.2 are satisfied:

1. From (2.57) to (2.60), $\Gamma$ is given by $$\Gamma = \Gamma_\Phi(\Phi_0) = 1 + \Phi_{C0} + \overline{\beta}^2(c \cdot \Phi_0 - c_\Psi \Psi_C(\Phi_0)), \quad (2.62)$$

where $\Phi_0$ is the equilibrium value of $\Phi$. In view of (2.61), it is clear that the function $\Gamma_\Phi(\cdot)$ is invertible. Thus, for each value of $\Gamma$, there is only one equilibrium $(\Phi, \Psi) = (\Gamma_\Phi^{-1}(\Gamma), \Psi_C(\Gamma_\Phi^{-1}(\Gamma)))$, which means that Assumption 2.2.1 is satisfied.

2. As we indicated above, it was proved in [16] that (2.61) guarantees that the equilibrium is exponentially stable not only locally but also globally, hence Assumption 2.2.2 is satisfied.

3. Following the notation in Section 2.2, $$y = h \circ l(\Gamma) \stackrel{\Delta}{=} \Psi_C(\Gamma_\Phi^{-1}(\Gamma)).$$

The Moore-Greitzer model (54)–(56) is scaled so that $\Psi_C(\Phi)$ always has a maximum at $\Phi=1$. Since $\Gamma_\Phi(\cdot)$ is bijective, $\Psi_C(\Gamma_\Phi^{-1}(\Gamma))$ has a maximum at $$\Gamma^* = 1 + \Phi_{C0} + \overline{\beta}^2(c \cdot - c_\Psi \Psi_C(1)), \quad (2.63)$$

that is, $$(\Psi_C \circ \Gamma_\Phi^{-1})'(\Gamma^*) = 0 \quad (2.64)$$

$$(\Psi_C \circ \Gamma_\Phi^{-1})''(\Gamma^*) < 0. \quad (2.65)$$

Hence, Assumption 2.2.3 is satisfied.

Figure 6:
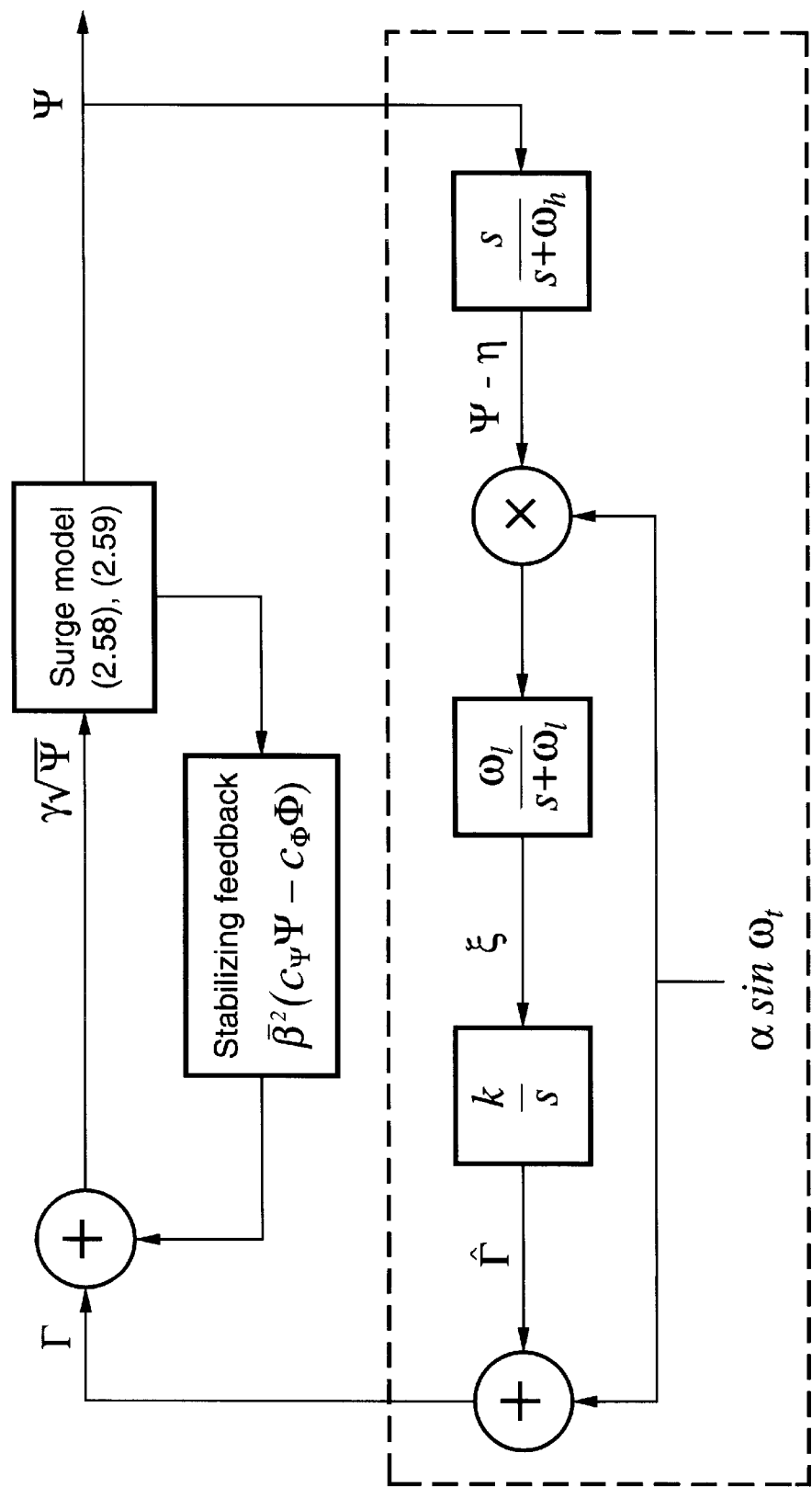
FIG. 6 is a functional block diagram of a peak seeking scheme in accordance with the present invention applied to the Greitzer surge model.

Since Assumptions 2.2.1 to 2.2.3 are satisfied, we can apply the peak seeking scheme given in FIG. 6 with $$\Gamma = \hat{\Gamma} + a\sin\omega t. \quad (2.66)$$

By Theorem 2.5.1, for sufficiently small $\omega$, $\delta$, and a, $\Phi(t)$ converges to an $O(\omega+\delta+a)$-neighborhood of 1 and $\Psi(t)$ converges to an $O(\omega+\delta+a)$-neighborhood of its maximum value $\Psi_C(1)$.

The application of the peak seeking method to the surge model (2.58), (2.59) will make clearer the application to the full Moore-Greitzer model (2.54)–(2.56) in the next subsection.

2.6.2 Peak seeking for the full Moore-Greitzer model.

Now we consider the full Moore-Greitzer model (2.54) to (2.56). I [18] we studied the stabilization of this model using the family of control laws $$\gamma = \frac{\Gamma + \overline{\beta}^2(c_\Psi \Psi - c_\Phi \Phi + c_R R - d_\Phi \dot{\Phi})}{\sqrt{\Psi}}, \quad (2.67)$$

and gave conditions for selecting the parameters $c_\Psi$, $c_\Phi$, $c_R$, and $d_\Phi$, such that local stabilization near the peak of the compressor characteristic is achieved. FIG. 6 shows bifurcation diagrams with respect to the parameter $\Gamma$, for the control law (2.67) with $d_\Phi=0$, applied to the MG model with the compressor characteristic $$\Psi_C(\Phi) = \Phi_{C0} + 1 + (1-\varepsilon)\left(\frac{3}{2}\Phi - \frac{1}{2}\Phi^3\right) + \varepsilon\frac{2\Phi}{1+\Phi^2}. \quad (2.68)$$

Treating $(R, \Phi, \Psi)$ as the state x, the-equilibrium map $x = l(\Gamma)$ is given by the bifurcation diagrams in FIG. 7A through FIG. 7D. The solid curves represent stabilized equilibria, while the dashed ones represent unstable equilibria. Like in Section 2.6.1, we take $y=\Psi$ as the output that we want to maximize using the peak seeking scheme. Unfortunately, none of the three assumptions in Section 2.2 are satisfied: (1) the function $x=l(\Gamma)$ is multi-valued, (2) the equilibrium at the peak is asymptotically stable but not exponentially stable, and (3) the output equilibrium map $y=h\circ l(\Gamma)$ has a maximum but it is not necessarily continuously differentiable. In spite of violating the assumptions, the peak seeking scheme can be applied to the full MG model. The scheme is given in FIG. 8. The closed loop system is $$\dot{R} = \frac{\sigma}{3\pi}\sqrt{R}\int_0^{2\pi}\Psi_C(\Phi + 2\sqrt{R}\sin\lambda)\sin\lambda d\lambda, R(0) \geq 0 \quad (2.69)$$

$$\dot{\Phi} = -\Psi + \frac{1}{2\pi}\int_0^{2\pi}\Psi_C(\Phi + 2\sqrt{R}\sin\lambda)\sin\lambda d\lambda \quad (2.70)$$

$$\dot{\Psi} = \frac{1}{\overline{\beta}^2}\left[1 + \Phi_{C0} - \hat{\Gamma} - a\sin\omega t - \overline{\beta}^2(c_\Psi\Psi - c_\Phi\Phi + c_R R - d_\Phi\dot{\Phi})\right] \quad (2.71)$$

$$\dot{\hat{\Gamma}} = k\xi \quad (2.72)$$

$$\dot{\xi} = \omega_l\xi + \omega_l(\Psi-\eta)a\sin\omega t \quad (2.73)$$

$$\dot{\eta} = -\omega_h\eta + \omega_h y. \quad (2.74)$$

The multiple equilibria in the full MG model make the closed-loop system (2.69) to (2.74) considerably more difficult to analyze than the closed-loop system in the case of the surge model. The solid curve in the $\Psi$ vs. $\Gamma-\Gamma^*$ plot in FIG. 7C plays the role of the function $v(.)$ in the averaging analysis in Section 4. Even though v is not continuously differentiable, we can show that the average equilibrium is $O(a)$-close to the point $(R, \Phi, \Psi)=0,1,\Psi_C(1))$, that it is to the right of the peak (on the flat side of the solid curve on the Ψ vs. Γ−Γ* plot), and that it is exponentially stable. The singular perturbation analysis consists of a study of the reduced model and the boundary layer model. The averaging analysis establishes the existence of an exponentially stable $O(\omega+a)$-small periodic orbit of the reduced model—a conclusion no different than for the surge model. The difference comes in the analysis of the boundary layer model:

$$\frac{dR_b}{dt} = \frac{\sigma}{3\pi}\sqrt{R_b}\int_0^{2\pi}\Psi_C(\Phi_b + 2\sqrt{R_b}\sin\lambda)d\lambda,\ R(0)\geq 0 \quad (2.75)$$

$$\frac{d\Phi_b}{dt} = -\Psi_b + \frac{1}{2\pi}\int_0^{2\pi}\Psi_C(\Phi_b + 2\sqrt{R_b}\sin\lambda)d\lambda \quad (2.76)$$

$$\frac{d\Psi_b}{dt} = \quad (2.77)$$

$$\frac{1}{\beta^2}\left[1+\Phi_{C0}-\Gamma-a\sin\omega t-\bar{\beta}^2\left(c_\Psi\Psi_b-c_\Phi\Phi_b+c_R R_b-d_\Phi\frac{d\Phi_b}{dt}\right)\right].$$

Except for the equilibrium for Γ=Γ*, the equilibria of interest in the boundary layer model are exponentially stable. The equilibrium for Γ=Γ* is only asymptotically stable. However any ball (with arbitrarily small but nonzero radius) around this equilibrium is exponentially stable. Or, to put it differently, the equilibrium for Γ=Γ* is exponentially practically stable with an arbitrarily small residual set. This set can be selected to be $O(\omega+a+\delta)$-small. Then by invoking Tikhonov's theorem on the infinite interval, we can draw the same conclusions as in Theorem 2.5.1, namely, that, for sufficiently small ω, δ, and a, the solution $(R(t),\Phi(t)\ \Psi(t),\hat{\Gamma}(t),\xi(t),\eta(t))$ converges to an $O(\omega+a+\delta)$-neighborhood of the point $(0,1,\Psi_C(1),\Gamma^*,0,\Psi_C(1))$.

EXAMPLE 2

2.6.3 Simulations for the full MG model.

Figure 8:
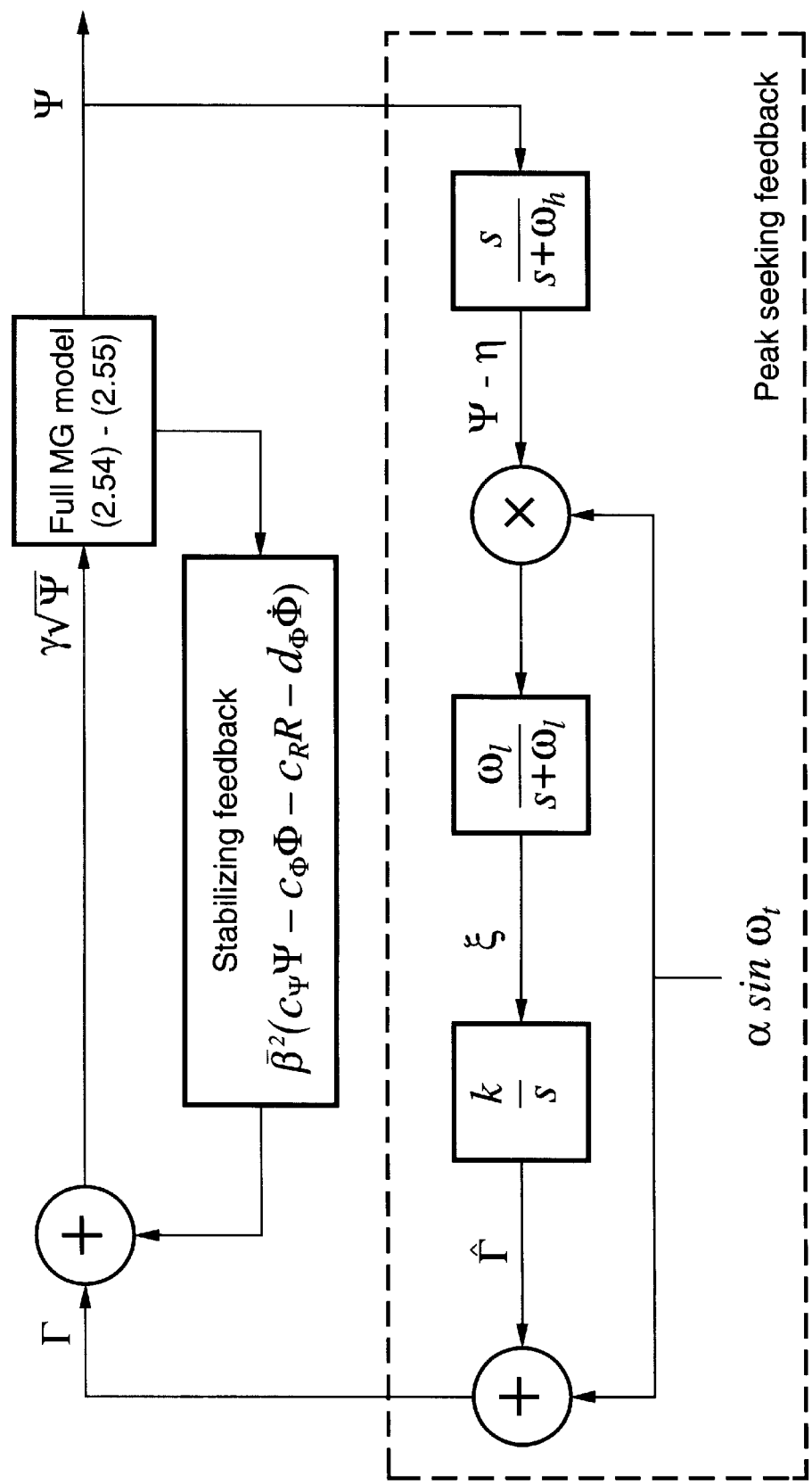
FIG. 8 is a functional block diagram of a peak seeking scheme in accordance with the present invention applied to the full Moore-Greitzer model.

We now present simulations of the peak seeking scheme from FIG. 8 for a compressor with $\Phi_C=0$, $\Psi_{C0}=0.72$, $\beta=142$, $\epsilon=0.9$, $\sigma=4$, and with a stabilizing controller whose parameters are $\bar{\beta}=1.42$, $c_\Psi=2$, $c_\Phi=4$, $c_R=7$, $d_\Phi=0$.

Figure 10:
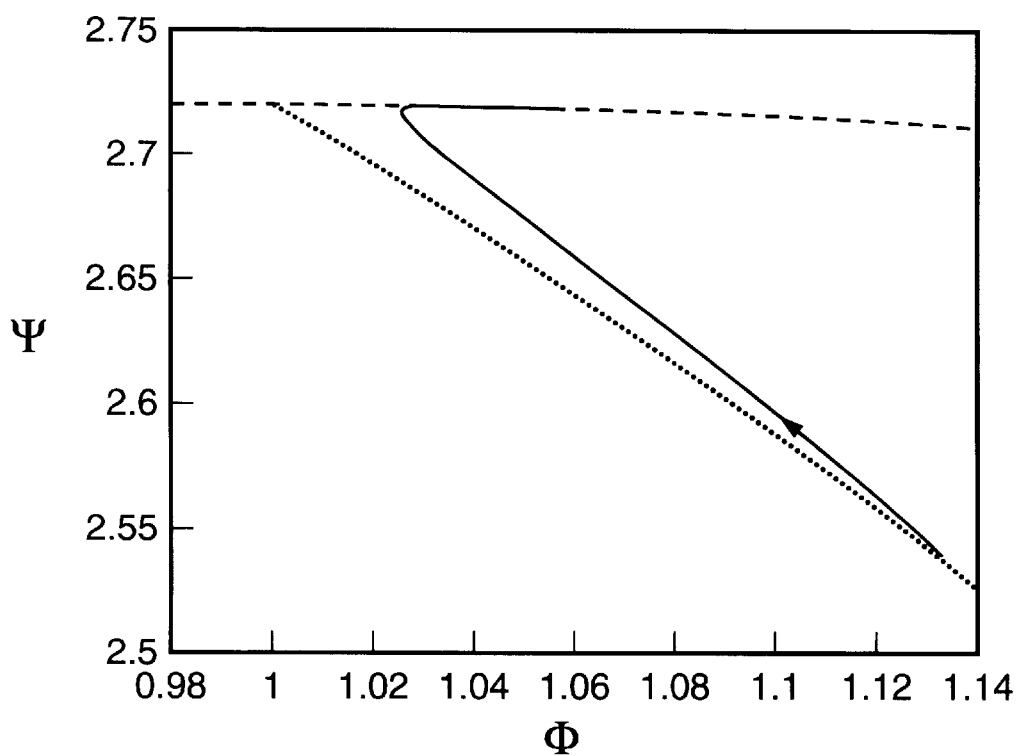
FIG. 10 is a graph of a trajectory under peak seeking feedback in accordance with the present invention for ω=0.03 and k=1.5.

Our first simulation employs a peak seeking scheme with a=0.05, $\omega=0.03, \omega_h=0.03, \omega_l=0.01$ and k=0.4. The trajectory is shown in where the solid curve represents the trajectory and the dashed lines represent the axisymmetric and stall characteristics. The trajectory starts from an equilibrium on the stall characteristic and converges to a small periodic orbit near the peak of the compressor characteristic. If the peak seeking parameters are selected differently, for example, if k increased to k=1.5, the new shape of the trajectory is shown in FIG. 10. In this case the convergence is smoother and faster but the periodic orbit is farther from the peak. (Note, however, that, given more time, the periodic orbit would slowly approach the peak.) Even though faster adaptation throws the periodic orbit further to the right of the peak, the periodic orbit remains in the "flat" region of the compressor characteristic where variations in mass flow Φ result in only minor variations of the pressure rise Ψ.

Figure 9:
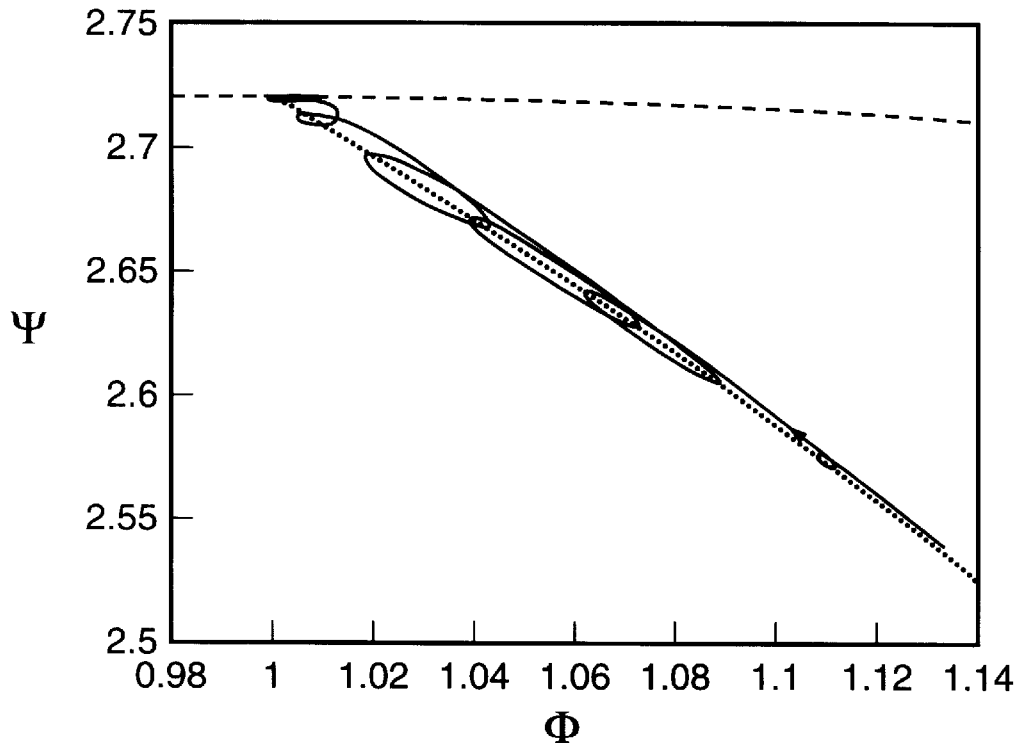
FIG. 9 is a graph of a trajectory under peak seeking feedback in accordance with the present invention for ω=0.03 and k=0.4.
Figure 11:
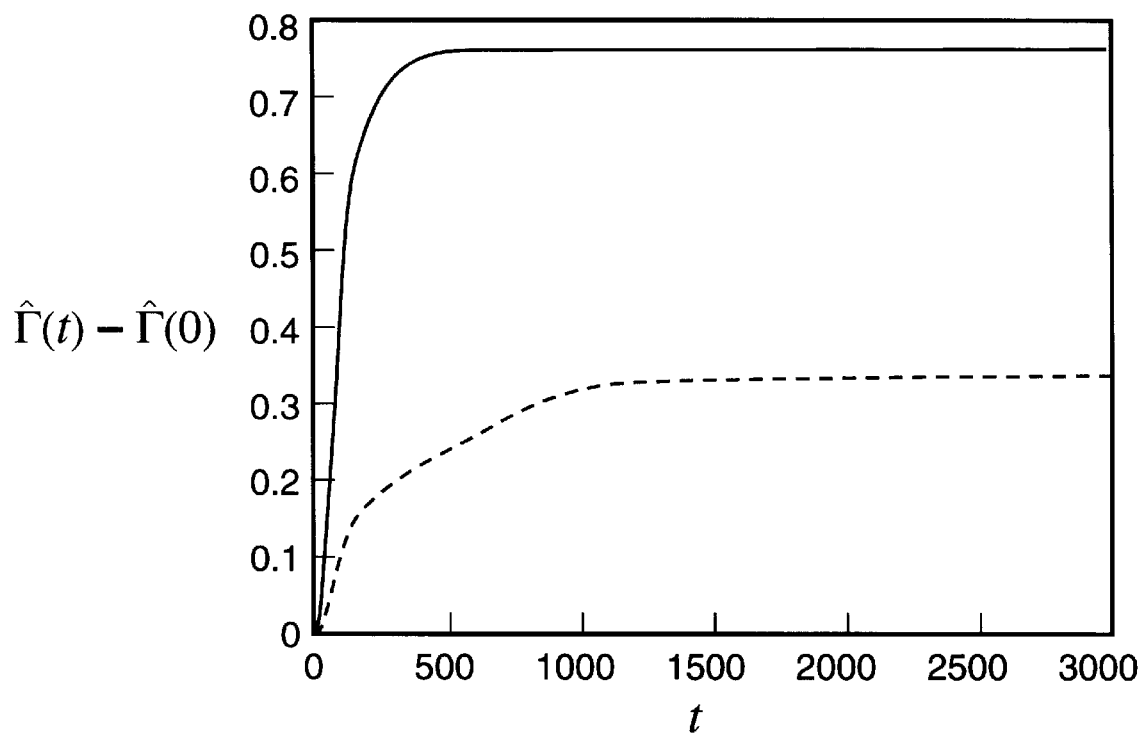
FIG. 11 is a graph showing the time response of $\hat{\Gamma}(t)-\hat{\Gamma}(0)$ for the trajectory of FIG. 9 (lower dashed line) and the trajectory of FIG. 10 (upper solid line).

As explained in the previous section, the convergence of the trajectory to a close neighborhood of the peak is the result of regulating $\hat{\Gamma}(t)$ to a neighborhood of Γ*. FIG. 11 shows the time traces of $\hat{\Gamma}(t)-\hat{\Gamma}(0)$ for the trajectories in FIG. 9 and FIG. 10. In this case $\hat{\Gamma}(0)=-1.2$ and Γ*=−0.90, which means that $\Gamma^*-\hat{\Gamma}(0)=0.30$. This explains why the trajectory in FIG. 9 converges closer to the peak than that in FIG. 10.

Figure 12:
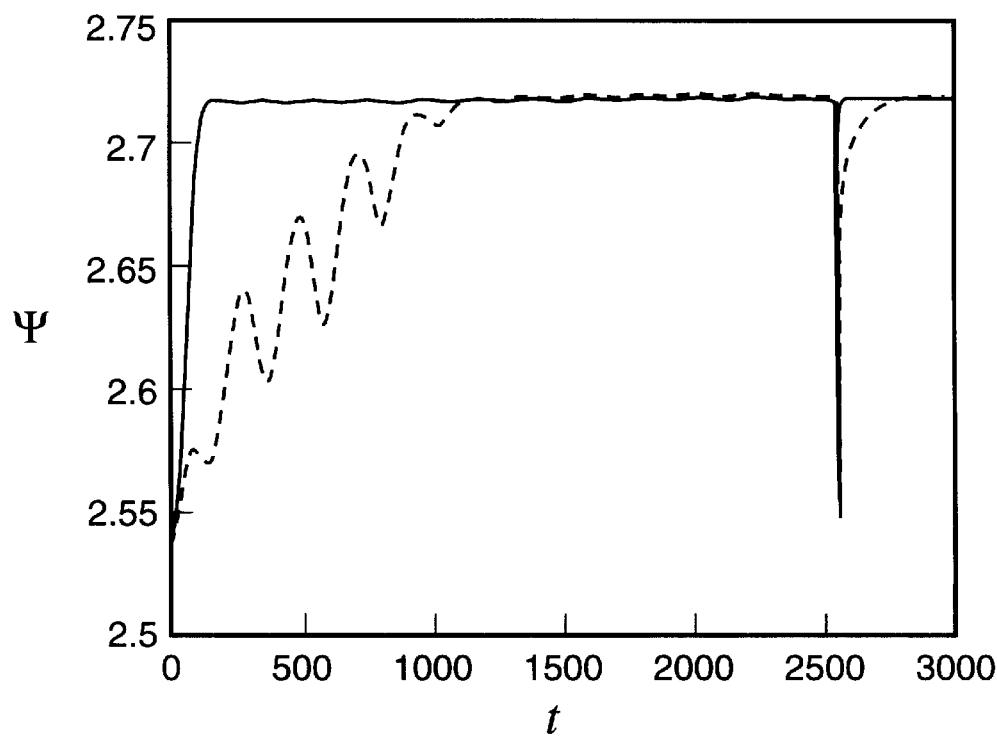
FIG. 12 is a graph showing the time response of the pressure rise, with the peak seeking feedback disconnected at t-2550, for the trajectory of FIG. 9 (lower dashed line) and the trajectory of FIG. 10 (upper solid line).
Figure 13:
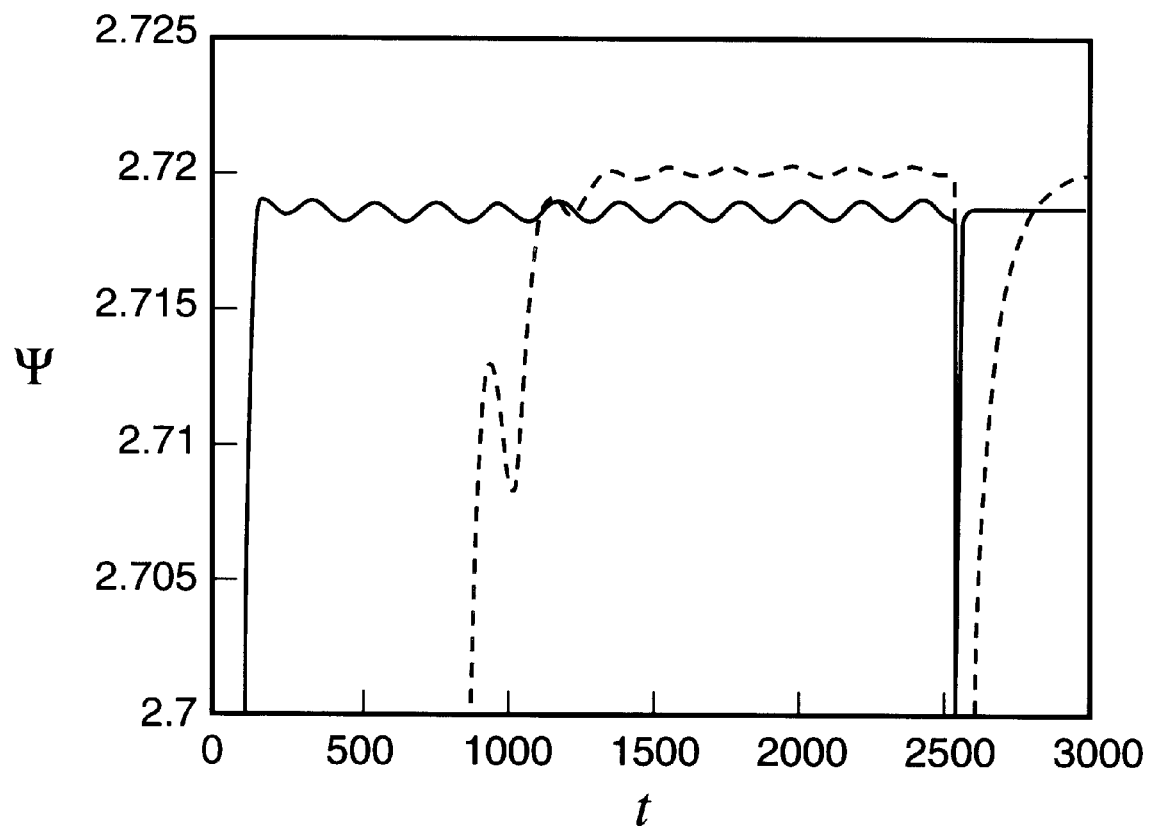
FIG. 13 is a graph showing a portion of the graph of FIG. 12 in detail.

Since a permanent presence of the periodic perturbation is undesirable, we now show that it can be disconnected after a short peak seeking period. FIG. 12 shows the pressure transient and steady state up to t=2550, at which time, k and a are set to zero. The disconnection of adaptation makes the trajectory transition from the periodic orbit to an equilibrium on the compressor characteristic, just to the right of the peak. To make the transient more visible, we have set R(2550+0)=0.06 because R(2550−0) is practically zero. FIG. 12 also shows that the pressure variations in steady state under the peak seeking feedback are hardly noticeable, especially if compared to a large gain in the DC value of the pressure. To show the pressure variations more clearly, we zoom in on them in FIG. 13.

EXAMPLE 3

2.7 Experimental Results.

2.7.1 Experimental Setup.

Figure 15:
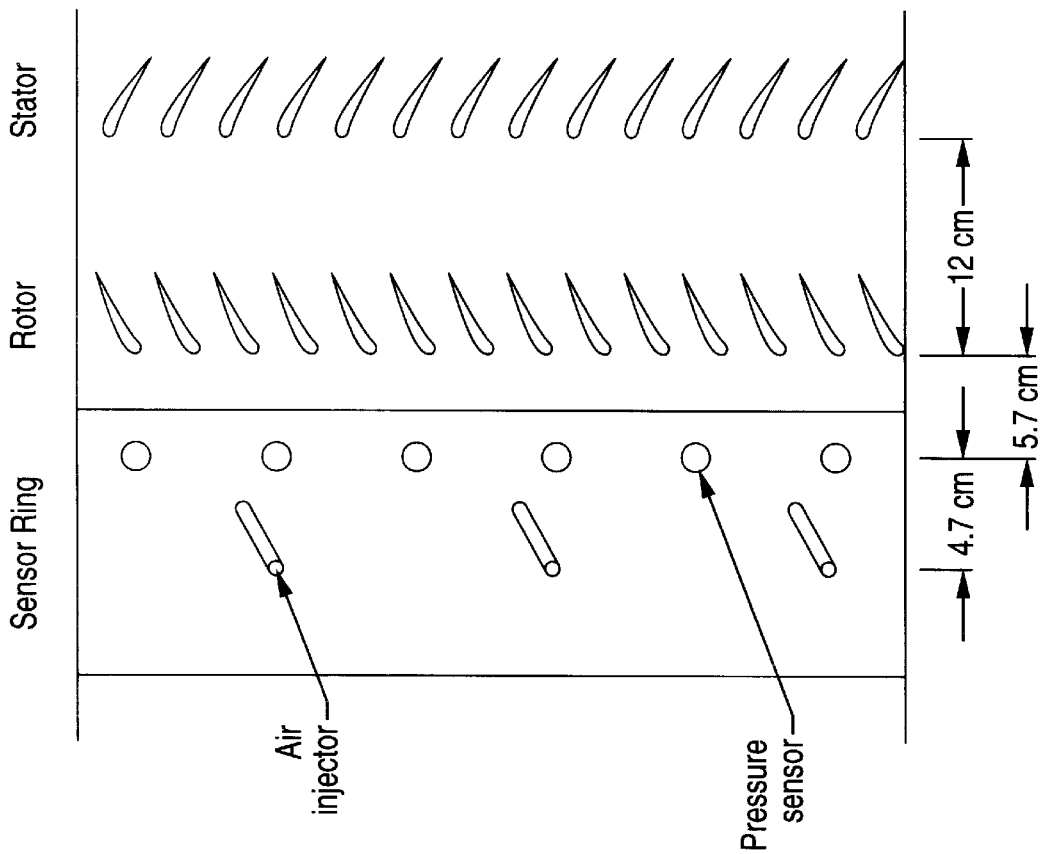
FIG. 15 is a schematic side view of the sensor and injection actuator ring shown in FIG. 14.
Figure 14:
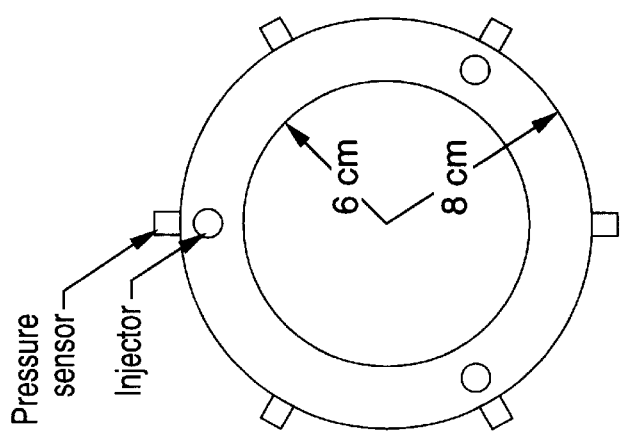
FIG. 14 is a schematic end view of a sensor and injection actuator ring employed on a test compressor.
Figure 16:
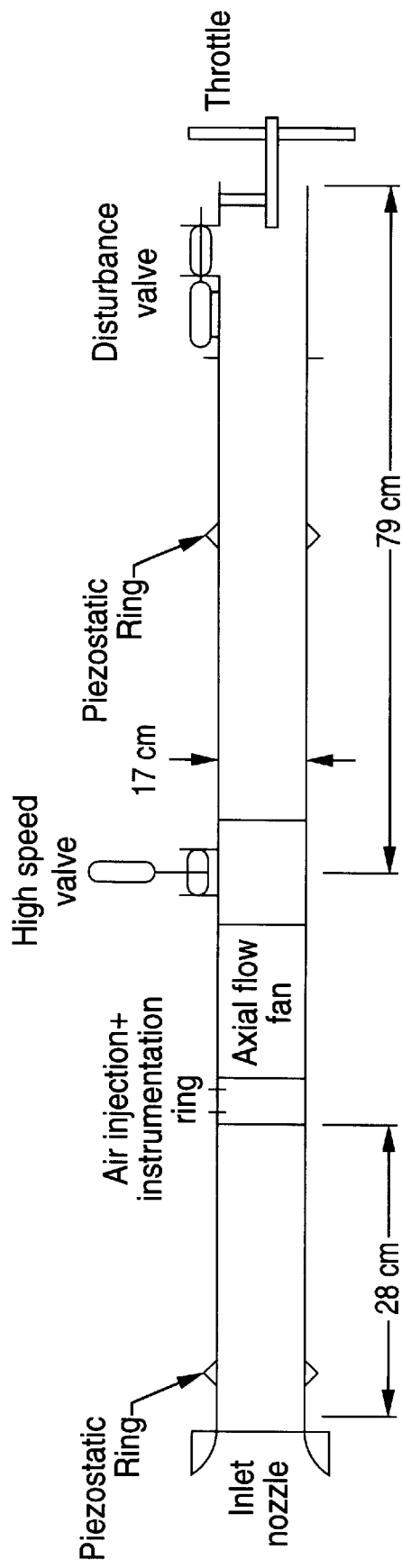
FIG. 16 is a schematic diagram of a test compressor rig.

The stall stabilization method of the invention was tested on a Caltech compressor rig. The Caltech compressor rig is a single-stage, low-speed, axial compressor with sensing and actuation capabilities. FIG. 14 and FIG. 15 show a magnified view of the sensor and injection actuator ring, and FIG. 16 a drawing of the rig. The compressor is an Able Corporation model 29680 single-stage axial compressor with 14 blades, a tip radius of 8.5 cm, and a hub radius of 6 cm. The blade stagger angle varies from 30° at the tip to 51.6° at the hub, and the rotor to stator distance is approximately 12 cm. Experiments are run with a rotor frequency of 100 Hz, giving a tip Mach number of 0.17. Rotating stall is observed under this condition on the Caltech rig with a frequency of 65 Hz while surge occurs at approximately 1.7 Hz. Data taken for a stall transition event suggests that the stall cell grows from the noise level to its fully developed size m approximately 30 msec (3 rotor revolutions). At stall inception point, the velocity of the mean flow through the compressor is approximately 16 m/sec.

Six static pressure transducers with 1000 Hz bandwidth are evenly distributed along the annulus of the compressor at approximately 5.7 cm from the rotor face. A discrete Fourier transform is performed on the signals from the transducers, and the amplitude and phase of the first and second mode of the stall cell associated with the total-to-static pressure perturbation are obtained. The difference between the pressure obtained from one static pressure transducer mounted at the piezostatic ring at the inlet and that from one mounted at another piezostatic ring downstream near the outlet of the system is computed as the pressure rise across the compressor. All of the static pressure transducer signals are filtered through a 4 th order Bessel low pass filter with a cutoff frequency of 1000 Hz before the signal processing phase in the software.

The air injectors are on-off type injectors driven by solenoid valves. For applications on the Caltech compressor rig, the injectors are fed with a pressure source supplying air at a maximum pressure of 80 PSI. Due to significant losses across the solenoid valves and between the valves and the pressure source, the injector back pressure reading does not represent an accurate indication of the actual velocity of the injected air on the rotor face. For example, using a hotwire anemometer, the maximum velocity of the injected air measured at a distance equivalent to the rotor-injector distance for 50 and 60 PSI injector back pressure are measured to be approximately 30.2 m/sec and 33.8 m/sec respectively. At the stall inception point, each injector can add approximately 1.7% mass, 2.4% momentum, and 1.3% energy to the system when turned on continuously at 60 PSI injector back pressure. The bandwidth associated with the injectors is approximately 200 Hz at 50% duty cycle.

Peak seeking is implemented via a bleed valve whose bandwidth is 51 Hz.

2.7.2 Stall stabilization.

Figure 17:
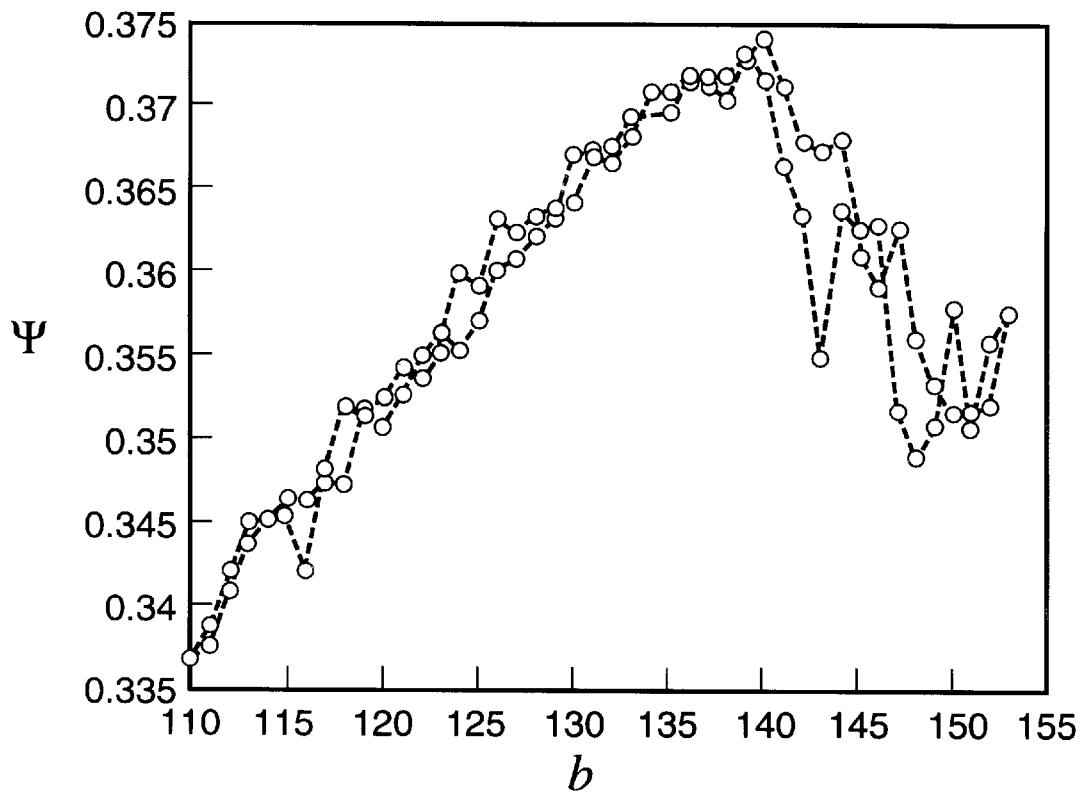
FIG. 17 is a graph showing measured pressure Ψ vs. bleed angle b test data for the test rig shown in FIG. 16.

Stall stabilization is performed by air injection in a one-dimensional on-off fashion. When the measured amplitude of the first mode of the stall cell is above a certain threshold, all three injectors are fully open. Otherwise they are closed. The set point of the compressor is varied by a bleed valve. The characteristic of the pressure rise $\Psi$ with respect to the bleed angle b is shown in FIG. 17. Note that higher bleed angle means lower overall throttle opening. There is a clear peak in the characteristic curve. The points to the left of the peak are axisymmetric equilibria. The points to the right of the peak are stabilized low amplitude stall equilibria.

2.7.3 Filter design.

Figure 18:
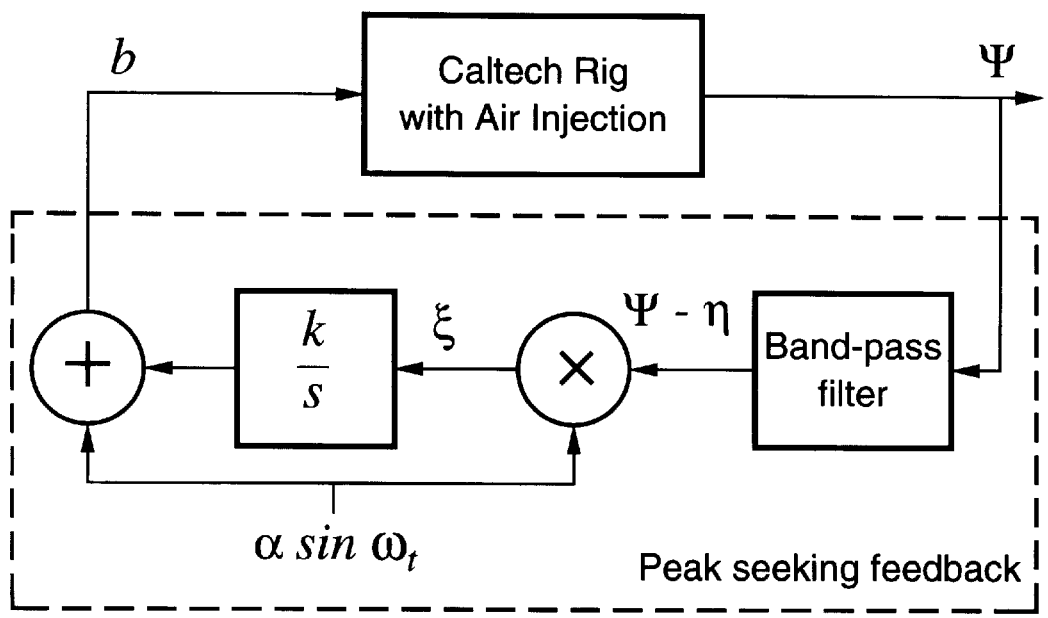
FIG. 18 is a functional block diagram of a peak seeking scheme in accordance with the present invention applied to the test rig shown in FIG. 16.

We implement the extremum seeking scheme in a configuration shown in FIG. 18. Because of noise in the experiment we use a band pass filter. From the power spectrum analysis, we learn that the noise is above 150 Hz. Also we know that the stall frequency is about 65 Hz. Since the filter should cut out both the high frequency noise and the stall oscillations, as well as DC, we choose the pass band to be 4 to 6 Hz, and implement it as 3rd order Butterworth filter. We do not use a low pass filter $$\frac{\omega_l}{s+\omega_l}.$$

2.7.4 Initial point at axisymmetric characteristic.

Figure 19:
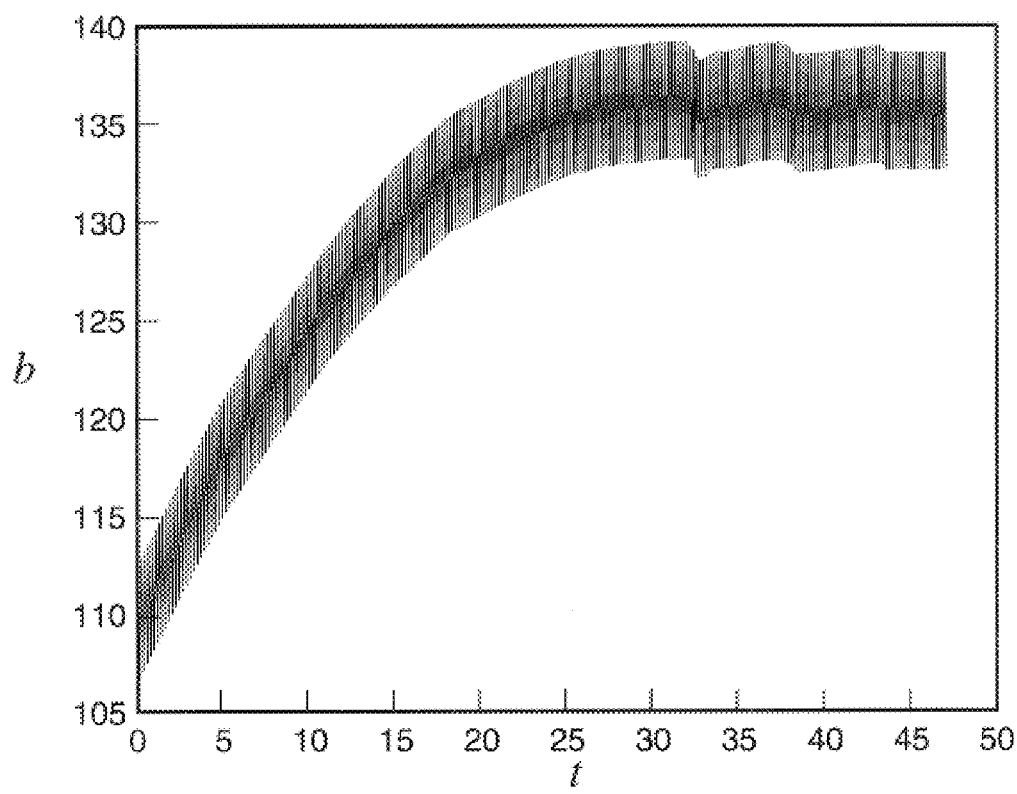
FIG. 19 is a graph showing the time response of the bleed angle initiating from the axisymmetric characteristic of the compressor of the test rig shown in FIG. 16.
Figure 20:
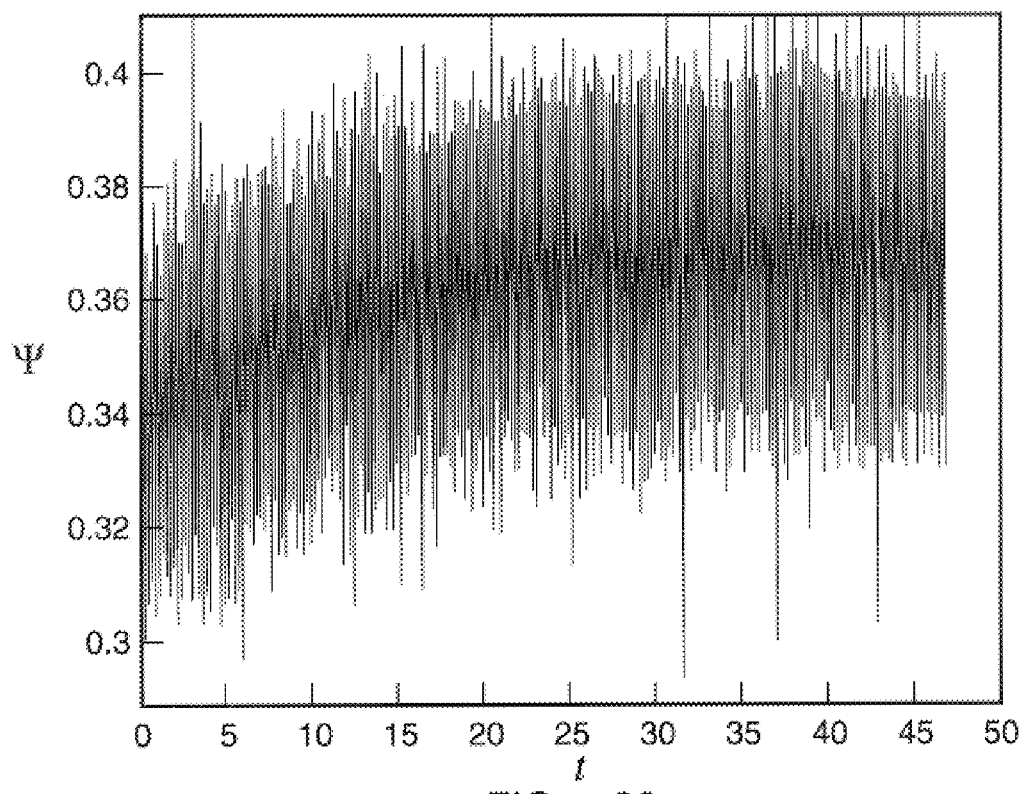
FIG. 20 is a graph showing the time response of the pressure rise initiating from the axisymmetric characteristic of the compressor of the test rig shown in FIG. 16.

We select the integrator gain as 600 and set the frequency of the perturbation to 5 Hz. From FIG. 17 we know that the peak is around 134 to139°. We set the initial bleed angle at 110°, the farthest point to the left in FIG. 17, and set the perturbation to 3°. The perturbed bleed angle is shown in FIG. 19 and the pressure rise response is shown in FIG. 20. Comparing the peak pressure rise 0.372 of FIG. 17 to that of FIG. 20, we see that they are the same.

2.7.5 Initial point at nonaxisymmetric characteristic.

For the compressor control, the most important issue is to control the system to avoid the stall that causes the deep pressure drop. Since the air injection can control stall for a reasonable interval, we can set the initial point at the stall characteristic. We select the initial point as 150° bleed valve angle because from FIG. 17 we can see that 150° is the largest angle we can achieve without a deep drop of the pressure rise. In this case we choose the gain of the integrator as 400. The perturbation signal is set to 3° as in the axisymmetric case. The perturbed bleed angle is shown in FIG. 21 and the pressure rise response is shown in FIG. 22. The peak pressure in FIG. 22 coincides with that in FIG. 17.

A closer look at FIG. 21 and FIG. 22 shows that the rotating stall amplitude reduces as the bleed angle reduces.

The effect of peak seeking on a system starting in rotating stall is to bring it out of stall without pushing the operating point away from the peak and reducing the pressure rise. In both FIG. 19 and FIG. 21 one can observe fluctuations of the mean of the bleed angle at the peak. Comparing with FIG. 20 and FIG. 22, we see that these fluctuations occur at the same time when pressure drops resembling stall inception occur. Peak seeking reacts to this by pushing the operating point further to the right on the axisymmetric characteristic and then slowly returning it to the peak.

2.7.6 Summary of Results.

This experiment clearly shows that the concept of extremum seeking holds considerable promise for optimizing operation of aeroengines via feedback. The actuation requirements are much more modest than for stabilization of rotating stall and surge because the periodic perturbation applied for extremum seeking is slow compared to the compressor dynamics, and the sharp peak of the $\Psi(\Gamma)$ map allows the use of a perturbation signal of a very small amplitude so magnitude saturation does not become an issue. The sensing requirement is also modest because only the pressure rise $\Psi$ is needed.

The extremum seeking has performed well in the high-noise experimental environment. In fact, the high noise makes the effect of the periodic perturbation hardly noticeable.

2.8 Conclusions.

We hope that the proof of stability of the extremum seeking scheme will revive interest in this practically important but regrettably neglected area of adaptive control research. Our proof covers only one implementation of extremum control-the method with a periodic perturbation. Other implementations, such as, for example, those where a relay provides self-excitation, would also be worth studying.

We believe that the concept of extremum seeking holds considerable promise for optimizing operation of aeroengines via feedback:

1. The actuation requirements are much more modest than for stabilization of rotating stall and surge because the periodic perturbation applied for extremum seeking is slow compared to the compressor dynamics, and the sharp peak of the $\Psi(\Gamma)$ map allows the use of a perturbation signal of a very small amplitude so magnitude saturation does not become an issue. The sensing requirement is also modest because only the pressure rise $\Psi$ is needed.

2. Because the peak seeking scheme requires an oscillatory regime to find the maximum, it should be used only in emergency situations where even a small increment in pressure rise is essential for the safe completion of a maneuver of the aircraft. This is similar to anti-lock braking where, in emergency situations, the driver's comfort becomes secondary and the primary concern is to achieve the maximum friction force in the "friction vs. wheel slip" map to maintain control over the vehicle. It seems reasonable that under normal operation of a compressor the peak seeking scheme would be kept inactive, and would only be activated when the rotating stall amplitude crosses a certain threshold value (indicating that the stabilized rotating stall equilibrium has fallen too far below the peak). This operation would be similar to anti-lock braking where insufficient deceleration (proportional to the friction force) turns on the ABS system.

3. The peak seeking scheme can be combined with any of the stabilizing control laws for rotating stall and surge available in the literature [2,7,11,16,18,20,30]. For example, the control law of Eveker et al. [7], given by $\lambda(R,\Phi)=\gamma_0+k_1R-k_2\Phi$, can be combined with a peak seeking loop which generates $\gamma_0=\hat{\gamma}_0+a \sin \Psi t$. The signal $\hat{\gamma}_0$ will adapt to any additive throttle disturbance, which temporarily throws the compressor operating point away from the peak. The peak seeking scheme is also compatible with other stabilization methods which do not use throttle actuation but, for example, use inlet guide vanes [28] or pulsed air injection [3]. Of course, the peak seeking loop would be closed through a bleed valve.

Those skilled in the art will appreciate that implementation of the present invention based on the foregoing specification is straightforward using conventional hardware and software, as well as conventional adaptive controllers. Accordingly, the details of those elements are not presented herein. Additionally, although the description above contains many specificities, these should not be construed as limiting the scope of the invention but as merely providing illustrations of some of the presently preferred embodiments of this invention. Thus the scope of this invention should be determined by the appended claims and their legal equivalents.

TABLE 1

Notation in the Moore-Greitzer model

| | |
|---|---|
| $\Phi = \hat{\phi}/W - 1 - \Phi_{C\text{-}0}$ | $\hat{\Phi}$ — annulus-averaged flow coefficient |
| | W — compressor characteristic semi-width |
| $\psi = \hat{\psi}/H$ | $\hat{\psi}$ — plenum pressure rise |
| | H — compressor characteristic semi-height |
| $A = \hat{A}/W$ | $\hat{A}$ — rotating stall amplitude |
| $\Phi_T$ | mass flow through the throttle/W − 1 |
| $\theta$ | angular (circumferential) position |
| $\beta = \dfrac{2H}{W}B$ | B — Greitzer stability parameter |
| $\sigma = \dfrac{3l_c}{m+\mu}$ | $l_c$ — effective length of inlet duct normalized by compressor radius |
| | m — Moore expansion parameter |
| | $\mu$ — compressor inertia with in blade passage |
| $t = \dfrac{H}{Wl_c}\hat{t}$ | $\hat{t}$ — (actual time) × (rotor angular velocity) |

APPENDIX A

```
% This .m file computes the time varying transfer function from the
% product of A_e and Phi_e to A_2e.
% First we load efc6207_st5_90%.mat, a file containing the data.
% The matrix of efc6207_st5 has eight columns and 10000+ rows
% consisting of pressure measurements at 8 angles around
% the stage.
clear
load efc6207_st5 _90%.mat
x=efc6207_st5;
nx=size(x);
% normalize data by prestall means and sdevs of each sensor
me=mean(x(1:1000, :));
sd=std(x(1:1000, :));
%x=(x-kron(me, ones (nx(1),1)))/diag(sd);
% The matrix SPACING is 8x1 and gives the angles at which
% the sensors are located. These angles are in degrees
% so we convert them to radians and store them
% in an 1x8 vector THETAS.
Thetas=spacing'/360*2*pi;
% Next we Fourier transform the data with respect to theta.
% Since we have eight sensors, we can resolve the 0, 1, 2, 3 modes.
% The resulting matrix is called AB, it is 7x10000+. The columns
% of AB contain the time histories of Phi, a1, b1, a2, b2, a3, b3
% where ai and bi are the cosine and sine coefficients
% of the ith mode.
T=[ones(1,nx(2)); cos(thetas); sin(thetas)];
T=[T; cos(2*thetas); sin(2*thetas); cos (3*thetas); sin(3*thetas)];
ab=x/T;
% We next compute the time histories of the amplitudes of the modes.
% The first column of A contains Phi, the second column contains
% A1, the amplitude of the mode 1, etc.
A=[ab(:,1) sqrt (ab(:,2).^2=ab(:,3).^2) . . .
    sqrt(ab(:,4).^2+ab(:,5).^2)sqrt(ab(:,6).^2+ab(:,7).^2];
% We time window the data, compute the spectrum
% of the window and then move the window over one step.
% The number of data points in a step and a window are
step=256;
window=8*step;
% This seemed to be the best for this data but could be changed.
% The number of time steps in the data is
n=floor(nx(1)/step);
% We set up some matrices to hold the spectral data.
T=[ ];
% We define the index i_2e of the spectrum matrix
% that corresponds to frequency 2e.
```

APPENDIX A-continued

```
m=128;
i_2e=4/sampr*rrev/60*m/2-1;
% If i_2e is greater than 63 we set it to 63.
i_2e=min ([i_2e, 63])
% We use Matlab's SPECTRUM function to compute the transfer
% between A*Phi and A.
for j=window:step:n*step
    sp=spectrum(A(j-window+1:j,1).*A(j-window+1:j,2),A(j-window+
    1:j,2),m);
    T=[T sp(i_2e,4)];
end
% Next we plot the precursor
plot([window/step:n], abs (T))
hold on
plot([window:nx(1)]/step, (x(window:nx(1),1)-ones(nx(1)-window+
1:nx(1),1))*10 ^2,
title('efc6207_st5_90%, window=2048, step=256')
xlabel('step=64 revs')
ylabel('Gain')
hold off
pause
plot([window/step:n],angle(T))
hold on
plot([window:nx(1)]/step, (x(window:nx(1),1)-ones(nx(1)-window+
1:nx(1),1)),'c-')
Title('efc6207_st5_90%, window=2048, step=256')
xlabel('step=64 revs')
ylabel('Phase')
hold off
```

What is claimed is:

1. A method for predicting stall in an axial flow compressor, comprising the steps of:

(a) obtaining pressure or axial velocity measurements as a function of time at a plurality of circumferential angles around a compressor stage having a rotor that rotates at a rotor frequency;

(b) discrete fourier transforming said measurements with respect to said circumferential angles to obtain zeroth, first and higher modes as a function of time; and (c) determining amplitude gain, at twice the rotor frequency, of a transfer function from the product of the zeroth and first modes to the first mode, with an increase in amplitude gain depicting a right skewed compressor going into stall and a decrease in amplitude gain depicting a left skewed compressor going into stall.

2. A method for predicting stall in an axial flow compressor, comprising the steps of:

(a) obtaining pressure or axial velocity measurements as a function of time at eight angles circumferentially around a compressor stage having a rotor that rotates at a rotor frequency;

(b) discrete fourier transforming said measurements into zeroth, first, second and third circumferential modes with respect to the angles at which said measurements were obtained;

(c) determining amplitudes of the modes as a function of time to create time histories of the amplitudes of the modes;

(d) within time windows, time windowing the histories of the amplitudes of the modes; and (e) computing, for each time window, a cross spectrum at twice the rotor frequency between the product of the amplitudes of the zeroth and first modes with the amplitude of the first mode, with an increase in cross spectrum depicting a right skewed compressor going into stall and a decrease in cross spectrum depicting a left skewed compressor going into stall.

3. A method for stabilizing rotating stall and surge instabilities in the compressor of an aeroturbine engine so that pressure rise to the combustor can be maximized, comprising the steps of creating an oscillatory motion of the pressure rise and feeding said oscillatory motion back to vary the set point of an extremum seeking controller.

4. A method as recited in claim 3, further comprising the steps of:
   (a) closing an internal rotating stall and surge feedback loop in said controller that stabilizes said compressor; and
   (b) closing an outer extremum seeking loop in said controller which maximizes the pressure rise.

5. A method for stabilizing rotating stall and surge instabilities in the compressor of an aeroturbine engine so that pressure rise to the combustor can be maximized, comprising the steps of creating an oscillatory motion of the pressure and feeding said oscillatory motion into an extremum seeking controller to vary the set point of said extremum seeking controller, wherein an internal rotating stall and surge feedback loop in said controller that stabilizes said compressor is closed and wherein an outer extremum seeking loop in said controller which maximizes the pressure rise is closed.

6. A method for predicting and stabilizing stall in axial flow compressors, comprising the steps of:
   (a) obtaining pressure or axial velocity measurements as a function of time at a plurality of circumferential angles around a compressor stage having a rotor that rotates at a rotor frequency;
   (b) discrete fourier transforming said measurements with respect to said circumferential angles to obtain zeroth, first and higher modes as a function of time;
   (c) determining amplitude gain, at twice the rotor frequency, of a transfer function from the product of the zeroth and first modes to the first mode, with an increase in amplitude gain predicting a right skewed compressor going into stall and a decrease in amplitude gain predicting a left skewed compressor going into stall; and
   (d) in response to predicted stall, creating an oscillatory motion of the pressure rise to a combustor downstream of the compressor and feeding said oscillatory motion into an extremum seeking controller to vary the set point of said extremum seeking controller.

7. A method as recited in claim 6, further comprising the steps of:
   (e) closing an internal rotating stall and surge feedback loop in said controller that stabilizes said compressor; and
   (f) closing an outer extremum seeking loop in said controller which maximizes the pressure rise.

8. A method for predicting and stabilizing stall in axial flow compressors, comprising the steps of:
   (a) obtaining pressure or axial velocity measurements as a function of time at eight angles circumferentially around a compressor stage having a rotor that rotates at a rotor frequency;
   (b) discrete fourier transforming said measurements into zeroth, first, second, and third circumferential modes with respect to the angles at which said measurements were obtained;
   (c) determining amplitudes of the modes as a function of time to create time histories of the amplitudes of the modes;
   (d) within time windows, time windowing the histories of the amplitudes of the modes;
   (e) computing, for each time window, at twice the rotor frequency a cross spectrum between the product of the amplitudes of the zeroth and first modes with the amplitude of the first mode, with an increase in cross spectrum predicting a right skewed compressor going into stall and a decrease in cross spectrum predicting a left skewed compressor going into stall; and
   (f) in response to predicted stall, creating an oscillatory motion of the pressure rise to a combustor downstream of the compressor and feeding said oscillatory motion to an extremum seeking controller to vary the set point of said extremum seeking controller.

9. A method as recited in claim 8, further comprising the steps of:
   (g) closing an internal rotating stall and surge feedback loop in said controller that stabilizes said compressor; and
   (h) closing an outer extremum seeking loop in said controller which maximizes the pressure rise.

10. An apparatus for predicting stall in an axial flow compressor, comprising:
    (a) means for obtaining pressure or axial velocity measurements as a function of time at a plurality of circumferential angles around a compressor stage having a rotor that rotates at a rotor frequency;
    (b) means for discrete fourier transforming said measurements with respect to said circumferential angles to obtain zeroth, first and higher modes as a function to time; and
    (c) means for determining amplitude gains at twice the rotor frequency, of a transfer function from the product of the zeroth and first modes to the first mode, with an increase in amplitude gain depicting a right skewed compressor going into stall and a decrease in amplitude gain depicting a left skewed compressor going into stall.

11. An apparatus for predicting stall in an axial flow compressor, comprising:
    (a) means for obtaining pressure or axial velocity measurements as a function to time at eight angles circumferentially around a compressor stage having a rotor that rotates at a rotor frequency;
    (b) means for fourier transforming said measurements into zeroth, first, second, and third circumferential modes with respect to the angles at which said measurements were obtained;
    (c) means for determining amplitudes of the modes as a function of time to create time histories of the amplitudes of the modes;
    (d) means for, within time windows, time windowing the histories of the amplitudes of the modes and computing, for each time window, at twice the rotor frequency a cross spectrum between the product of the amplitudes of the zeroth and first modes with the amplitude of the first mode, with an increase in cross spectrum depicting a right skewed compressor going into stall and a decrease in cross spectrum depicting a left skewed compressor going into stall.

12. An apparatus for stabilizing rotating stall and surge instabilities in the compressor of an aeroturbine engine so that pressure rise to the combustor can be maximized, comprising:
    (a) means for creating an oscillatory motion of the pressure rise; and
    (b) means for feeding said oscillatory motion to an extremum seeking controller to vary the set point of said extremum seeking controller.

13. An apparatus as recited in claim 12, further comprising:
  (a) means for closing an internal rotating stall and surge feedback loop in said controller that stabilizes said compressor; and
  (b) means for closing an outer extremum seeking loop in said controller which maximizes the pressure rise.

14. An apparatus for stabilizing rotating stall and surge instabilities in the compressor of an aeroturbine engine so that pressure rise to the combustor can be maximized, comprising:
  (a) means for creating an oscillatory motion of the pressure; and
  (b) means for feeding said oscillatory motion to an extremum seeking controller to vary the set point of said extremum seeking controller, wherein an internal rotating stall and surge feedback loop in said controller that stabilizes said compressor is closed and wherein an outer extremum seeking loop in said controller which maximizes the pressure rise is closed.

15. An apparatus for predicting and stabilizing stall in axial flow compressors, comprising:
  (a) means for obtaining pressure or axial velocity measurements as a function of time at a plurality of circumferential angles around a compressor stage having a rotor that rotates at a rotor frequency;
  (b) means for discrete fourier transforming said measurements with respect to said circumferential angles to obtain zeroth, first and higher modes as a function of time;
  (c) means for determining amplitude gains at twice the rotor frequency, of a transfer function from the product of the zeroth and first modes to the first mode, with an increase in amplitude gain predicting a right skewed compressor going into stall and a decrease in amplitude gain predicting a left skewed compressor going into stall; and
  (d) means for, in response to predicted stall, creating an oscillatory motion of the pressure rise to a combustor downstream of the compressor and feeding said oscillatory motion back to vary the set point of an extremum seeking controller.

16. A method as recited in claim 15, further comprising:
  (a) means for closing an internal rotating stall and surge feedback loop in said controller that stabilizes said compressor; and
  (b) means for closing an outer extremum seeking loop in said controller which maximizes the pressure rise.

17. An apparatus for predicting and stabilizing stall in axial flow compressors, comprising:
  (a) means for obtaining pressure or axial velocity measurements as a function of time at eight angles circumferentially around a compressor stage having a rotor that rotates at a rotor frequency;
  (b) means for discrete fourier transforming said measurements into zeroth, first, second, and third circumferential modes with respect to the angles at which said measurements were obtained;
  (c) means for determining amplitudes of the modes as a function of time to create time histories of the amplitudes of the modes;
  (d) means for, within time windows, time windowing the histories of the amplitudes of the modes and computing, for each time window, at twice the rotor frequency a cross spectrum between the product of the amplitudes of the zeroth and first modes with the amplitude of the first mode, with an increase in cross spectrum predicting a right skewed compressor going into stall and a decrease in cross spectrum predicting a left skewed compressor going into stall; and
  (e) means for, in response to predicted stall, creating an oscillatory motion of the pressure rise to a combustor downstream of the compressor and feeding said oscillatory motion back to vary the set point of an extremum seeking controller.

18. An apparatus as recited in claim 17, further comprising:
  (a) means for closing an internal rotating stall and surge feedback loop in said controller that stabilizes said compressor; and
  (b) means for closing an outer extremum seeking loop in said controller which maximizes the pressure rise.

\* \* \* \* \*